(12) United States Patent
Wang et al.

(10) Patent No.: US 11,820,012 B1
(45) Date of Patent: Nov. 21, 2023

(54) ROBOT ARM AND JOINT MODULE

(71) Applicant: SHENZHEN YUEJIANG TECHNOLOGY CO., LTD., Shenzhen (CN)

(72) Inventors: Zhongbin Wang, Shenzhen (CN); Yu Jiang, Shenzhen (CN); Yingbo Lei, Shenzhen (CN); Weizhi Ye, Shenzhen (CN); Lun Wang, Shenzhen (CN); Ming Zhang, Shenzhen (CN)

(73) Assignee: SHENZHEN YUEJIANG TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/093,816

(22) Filed: Jan. 6, 2023

(30) Foreign Application Priority Data

Oct. 8, 2022  (CN) .......................... 202211229329.6

(51) Int. Cl.
| | |
|---|---|
| B25J 17/00 | (2006.01) |
| B25J 9/12 | (2006.01) |
| B25J 19/00 | (2006.01) |
| B25J 9/10 | (2006.01) |

(52) U.S. Cl.
CPC ............ *B25J 9/126* (2013.01); *B25J 9/1025* (2013.01); *B25J 19/0004* (2013.01)

(58) Field of Classification Search
CPC .............................. F16H 49/001; B25J 9/1025
See application file for complete search history.

(56) References Cited

FOREIGN PATENT DOCUMENTS

| | | | |
|---|---|---|---|
| CN | 105840766 A | | 8/2016 |
| CN | 106217405 A | | 12/2016 |
| CN | 205811762 U | | 12/2016 |
| CN | 208896129 U | | 5/2019 |
| CN | 111113476 A | | 5/2020 |
| CN | 114183514 A | | 3/2022 |
| CN | 217046472 U | * | 7/2022 |
| CN | 217046472 U | | 7/2022 |
| CN | 217669477 U | | 10/2022 |
| DE | 102016223796 A1 | | 3/2018 |

* cited by examiner

Primary Examiner — Randell J Krug

(57) ABSTRACT

A joint module is provided which includes a housing, a driving assembly, a speed reduction assembly, a first fastener, a second fastener and a third fastener. The driving assembly includes an output shaft, a lower bearing seat and a lower bearing, an inner ring and an outer ring of the lower bearing are respectively connected with the output shaft and the lower bearing seat. The first fastener fixes the lower bearing seat on the housing, and the second fastener fixes the speed reduction assembly on the housing. The third fastener fixes the input shaft of the speed reduction assembly to the output shaft. The output shaft of the driving assembly and the input shaft of the speed reduction assembly are separate structural members, which not only allows the driving assembly and the speed reduction assembly to be tested separately before assembly, but also facilitates the later maintenance.

20 Claims, 14 Drawing Sheets

1145

1129

1129

ROBOT ARM AND JOINT MODULE

TECHNICAL FIELD

The present disclosure relates to technical field of robot arms, in particular to a robot arm and its joint module.

BACKGROUND

With the continuous development of science and technology, robot arms are not only used to replace monotonous, repetitive and dangerous work in manufacturing to improve the automation degree and reduce the labor cost, but also used to achieve a human-machine cooperation with operators to complete some special works with higher difficulty, complexity and accuracy. Therefore, the performance and reliability of the joint module of the robot arm, such as a driving assembly, a speed reduction assembly, and other components, are particularly important. However, in related arts (such as CN214520197U), a rotor of the driving assembly is fixed on an input shaft of the speed reduction assembly, that is, the driving assembly does not have an independent output shaft. So that it is difficult to independently carry out a performance test to the driving assembly, accordingly, the reliability of the driving assembly can hardly be ensured. As a result, the performance test for the driving assembly can only be carried out after the driving assembly is assembled with the speed reduction assembly and a housing. If the driving assembly does not pass the performance test, it needs to remove the driving assembly from the speed reduction assembly. Therefore, there may exist the defects of needing to assemble and disassemble the driving assembly repeatedly, and resulting a damage to the driving assembly during assembly and disassembly, which greatly reduces the production efficiency and increases the production cost.

SUMMARY

An embodiment of the present disclosure provides a joint module of a robot arm, the joint module includes: a housing, a driving assembly, a speed reduction assembly, a first fastener, a second fastener, and a fourth fastener. The driving assembly includes a lower bearing seat and a lower bearing, an outer ring of the lower bearing is connected with the lower bearing seat. The first fastener is configured to fix the lower bearing seat on the housing. The second fastener is configured to fix the speed reduction assembly on the housing. The speed reduction assembly includes an input shaft, a wave generator connected with the input shaft, a flexible wheel sleeved on the wave generator, a rigid wheel sleeved on the flexible wheel, and an outer bearing. The flexible wheel includes a cylindrical engaging portion and an annular bending portion obliquely connected with the cylindrical engaging portion, the annular bending portion extends to an outside of the cylindrical engaging portion, the cylindrical engaging portion is partially engaged with the rigid wheel. The fourth fastener is configured to fix the annular bending portion on an outer ring of the outer bearing, a part of the fourth fastener protrudes from the annular bending portion being arranged in an avoiding hole of the lower bearing seat. The rigid wheel is connected with an inner ring of the outer bearing.

Another embodiment of the present disclosure provides a robot arm which includes the above mentioned joint module.

In the joint module provided in the present disclosure, the output shaft of the driving assembly and the input shaft of the speed reduction assembly are separate structural members, and the two are detachably connected by fasteners, which not only allows the driving assembly and the speed reduction assembly to be tested separately before assembly, but also facilitates the later maintenance, and further helps to reduce the vibration and noise of the speed reduction assembly.

BRIEF DESCRIPTION OF THE DRAWINGS

In order to more clearly illustrate the embodiments of the present disclosure or the technical solutions, the accompanying drawings will be briefly described below. Obviously, the drawings are only some embodiments of the present disclosure, for those skilled in the arts, other drawings may be obtained according to the drawings without any creative work.

DETAILED DESCRIPTION

The technical solutions of the embodiments of the present disclosure will be clearly and completely described in the following with reference to the accompanying drawings. It is obviously that the embodiments to be described are only a part rather than all of the embodiments of the present disclosure. All other embodiments obtained by persons skilled in the art based on the embodiments of the present disclosure without creative efforts shall fall within the protection scope of the present disclosure.

The "embodiments" in the present disclosure means that specific features, structures, or characteristics described in the embodiments may be included in at least one embodiment of the present disclosure. Persons skilled in the art may explicitly and implicitly understand that the embodiments described in the present disclosure is capable of being combined with other embodiments.

Figure 1:
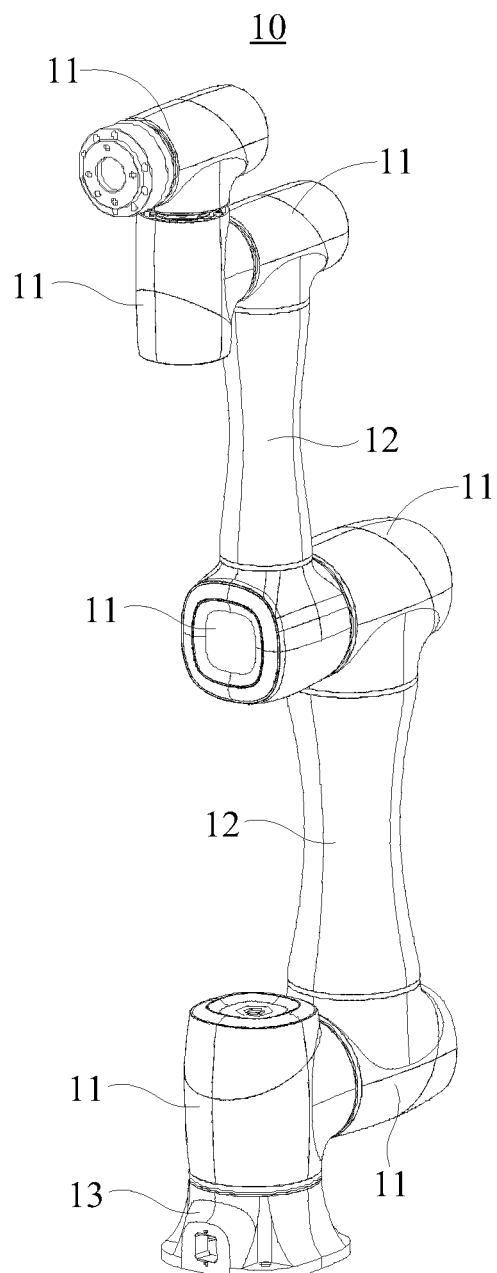
FIG. 1 is a structural diagram of a robot arm according to an embodiment of the present disclosure.

Referring to FIG. 1, a robot arm 10 includes a joint module 11, a connecting arm 12, and a base 13. The quantity of each of the joint module 11 and connecting arm 12 may be more than one, and the joint module 11 and connecting arm 12 may be directly or indirectly connected to the base 13 in certain sequence, allowing a tail end of the robot arm 10 away from the base 13 to have different freedom degrees and positions in a three-dimensional space to meet operation requirements in various application scenarios. The robot arm 10 may be an industrial robot arm. Compared with other robot arms such as a desktop robot arm for education, the tail end of the industrial robot arm is configured to grasp heavy objects and bear large loads, so it is necessary to reasonably design the joint module 11 and other structures.

Figure 2:
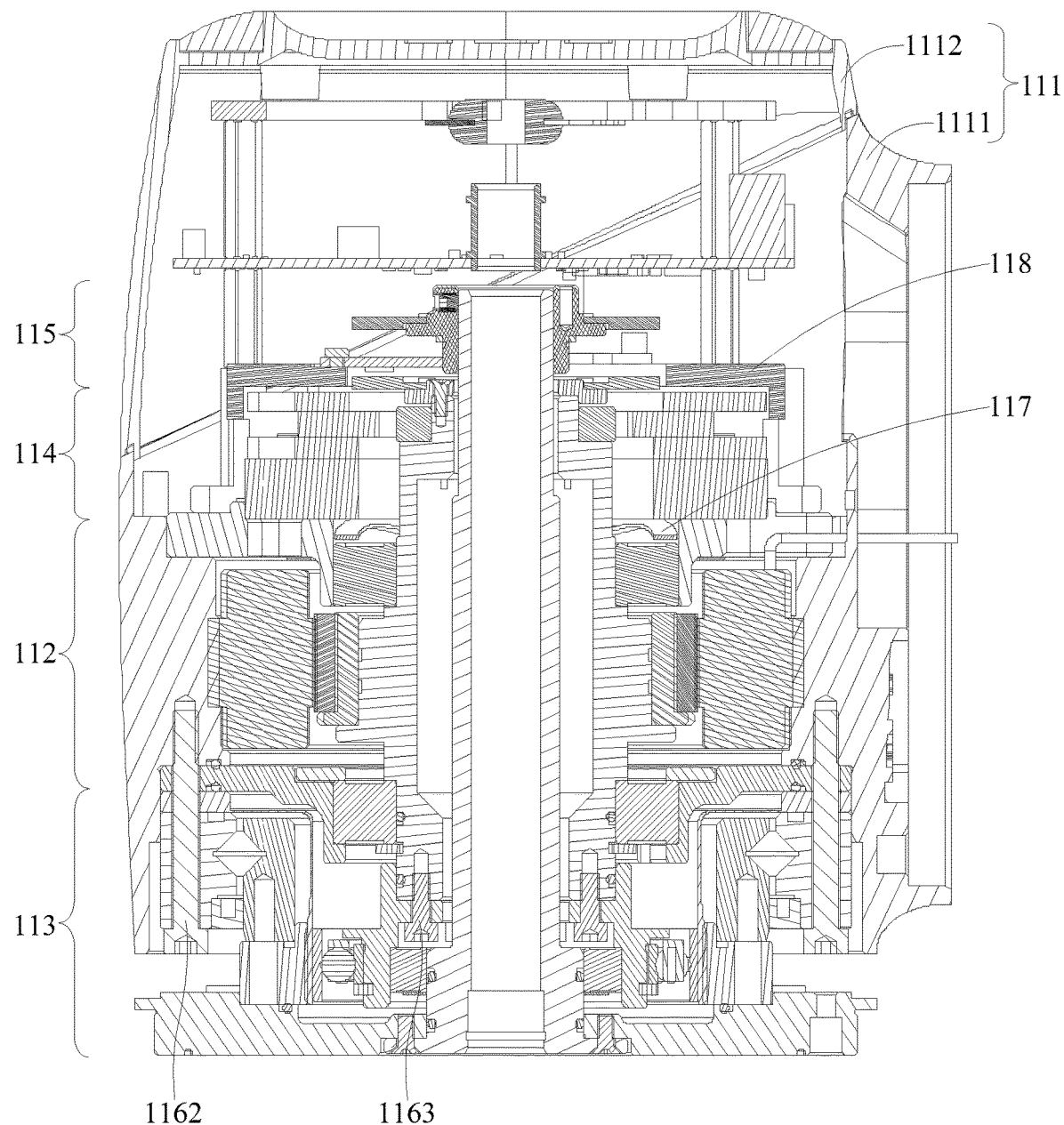
FIG. 2 is a cross sectional diagram of a joint module according to an embodiment of the present disclosure.

Illustratively, in combination with FIG. 2, the joint module 11 includes a housing 111, a driving assembly 112, a speed reduction assembly 113, a braking assembly 114, and an encoding assembly 115. The housing 111 may also be served as a housing of the driving assembly 112. That is, relevant structures of the driving assembly 112 may be directly installed on the housing 111, and structures such as the speed reduction assembly 113, the braking assembly 114, and the encoding assembly 115 may also be directly or indirectly installed on the housing 111 according to a certain assembly sequence, making the structures of the joint module 11 be integrated, namely, "integrated joint module". In this way, it is beneficial to simplify the structure of the joint module 11, and reduce the cost of the joint module 11. Of course, in other embodiments such as those with a low integration requirement, the driving assembly 112 may also have a housing independent of the housing 111, that is, the driving assembly 112 can be independently used after being separated from the housing 111.

In some embodiments, the driving assembly 112 is mainly configured to drive the joint module 11 or the connecting arm 12 connected with the driving assembly 112 to rotate, the speed reduction assembly 113 is mainly configured to carry out speed matching and transmitting torque among the joint module 11, the connecting arm 12, and other structures, the braking assembly 114 is mainly configured to make the driving assembly 112 switch between a rotating state and a braking state, and the encoding assembly 115 is mainly configured to detect the rotation, including the rotating speed and angular position, of at least one of the driving assembly 112 and the speed reduction assembly 113. The speed reduction assembly 113 and the braking assembly 114 may be arranged on the opposite sides of the driving assembly 112, and the encoding assembly 115 may be arranged on a side of the braking assembly 114 away from the driving assembly 112.

Figure 3:
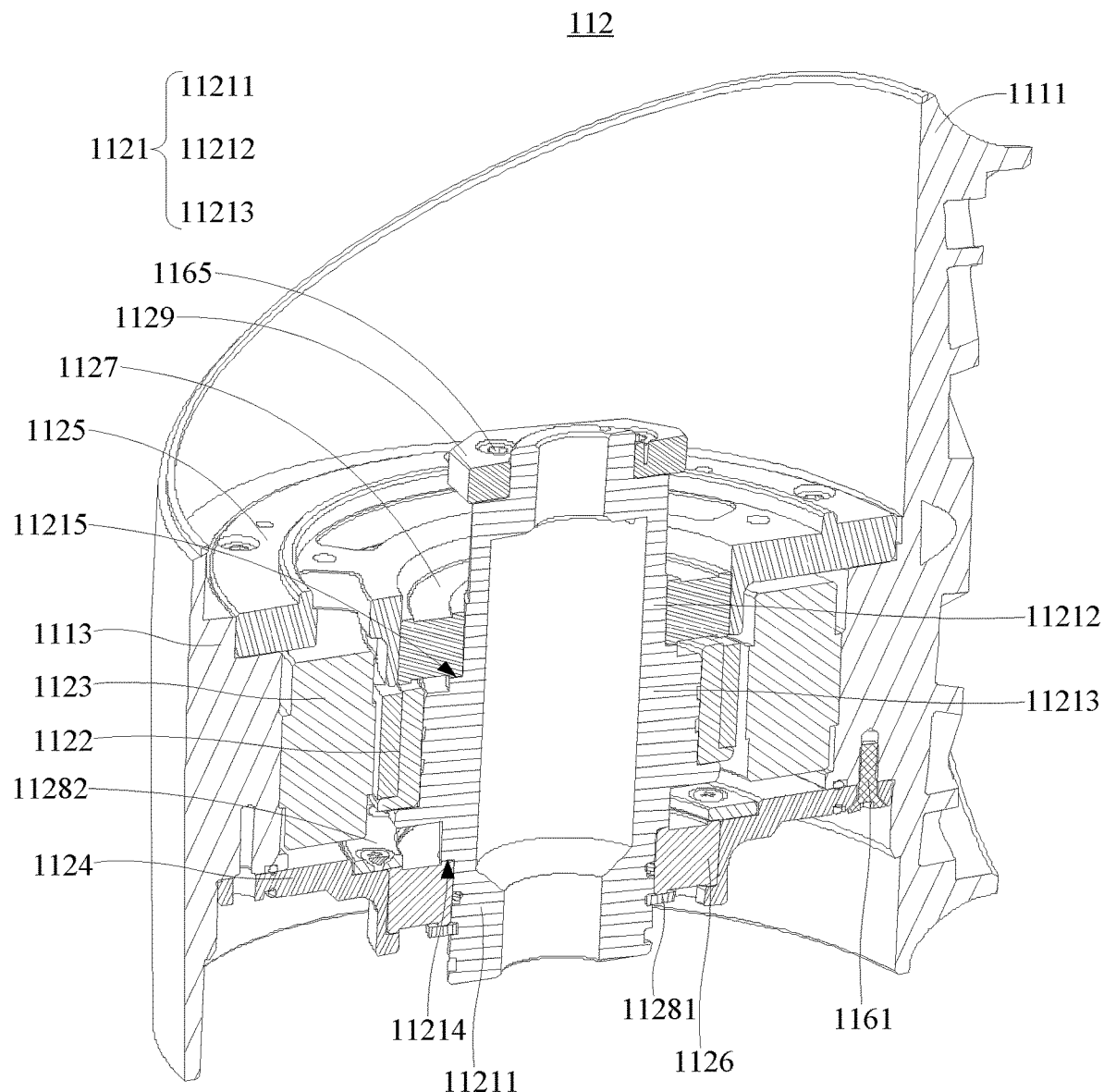
FIG. 3 is a cross sectional diagram of a driving assembly and a housing according to an embodiment of the present disclosure.

Illustratively, in combination with FIGS. 2 and 3, the housing 111 includes a first housing 1111 and a second housing 1112 connected with the first housing 1111, the first housing 1111 and the second housing 1112 may define a cavity structure with a certain volume. An inner side of the first housing 1111 is provided with a first annular supporting platform 1113, and a region where the first annular supporting platform 1113 is located has a thicker wall thickness compared with other regions of the first housing 1111, so as to increase a local structural strength of the first housing 1111; an outer side of the first housing 1111 is defined with an assembly region which is configured to connect with the joint module 11 or the connecting arm 12, an area where the assembly region located also has a thicker wall thickness compared with other areas of the first housing 1111, so as to increase a local structural strength of the first housing 1111. As a result, compared with the second housing 1112, the first housing 1111 may have a higher structural strength in terms of both material and structural design. In this way, sub housings of the housing 111 may be designed differently according to actual needs, which is conducive to reducing the cost of the joint module 11. Furthermore, the second housing 1112 may cover the encoding assembly 115, to protect internal structures of the joint module 11.

Illustratively, in combination with FIG. 3, the driving assembly 112 includes an output shaft 1121, a rotor 1122 connected with the output shaft 1121, a stator 1123 embedded in the first annular supporting platform 1113, a lower bearing seat 1124 and an upper bearing seat 1125 respectively connected with two opposite sides of the first annular supporting platform 1113 in an axial direction of the output shaft 1121, a lower bearing 1126 embedded in the lower bearing seat 1124, and an upper bearing 1127 embedded in the upper bearing seat 1125; the rotor 1122 is arranged on an inner side of the stator 1123. An inner ring and an outer ring of the lower bearing 1126 are respectively connected with the output shaft 1121 and the lower bearing seat 1124, and an inner ring and an outer ring of the upper bearing 1127 are respectively connected with the output shaft 1121 and the upper bearing seat 1125. That is, the lower bearing 1126 and the upper bearing 1127 are sleeved around the output shaft 1121, and are respectively arranged on both sides of the rotor 1122 in the axial direction of the output shaft 1121. Furthermore, the rotor 1122 includes a magnet, and the stator 1123 includes a coil, such that members such as carbon brushes may be omitted, which simplifies the wiring of the driving assembly 112, and reduces the cost of the driving assembly 112. In order to meet speed and power output requirements of the driving assembly 112, the quantity of the magnet may be more than one, and the quantity of the coil may also be more than one. Correspondingly, the speed reduction assembly 113 and the braking assembly 114 may be respectively connected with both ends of the output shaft 1121, and the encoding assembly 115 may be connected with one end of the output shaft 1121 adjacent to the braking assembly 114.

It should be noted that all directional indications (such as up, down, left, right, front, back, etc.) in the embodiments of the present disclosure are only configured to explain relative positional relationships, motions, etc. among components in a specific attitude (as shown in FIG. 2). If the specific attitude changes, the directional indication will also change accordingly. For example, "lower bearing seat", "upper bearing seat", "lower bearing" and "upper bearing" as shown in FIG. 3 may be corresponding to "front bearing seat", "rear bearing seat", "front bearing" and "rear bearing" after the joint module in FIG. 2 is rotated by 90°, and may also be corresponding to "left bearing seat", "right bearing seat", "left bearing" and "right bearing".

In some embodiments, one of the lower bearing seat 1124 and the upper bearing seat 1125 is integrated with the first housing 1111, and the other one of the lower bearing seat 1124 and the upper bearing seat 1125 is a separate structural member. The two members may be connected by at least one of the assembly methods including gluing, clamping, welding, and threaded connecting. In this way, the assembly efficiency of the driving assembly 112 is improved.

In some embodiments, the housing 111, the lower bearing seat 1124, and the upper bearing seat 1125 may be separate structural members, and they may be respectively connected with the first annular supporting platform 1113 by at least one one of the assembly methods including gluing, clamping, welding, threaded connecting, etc. Similarly, the first housing 1111, the lower bearing seat 1124, and the upper bearing seat 1125 may be designed differently in terms of material, structural design, and molding process, which is conducive to reduce the cost of the joint module 11.

Illustratively, in combination with FIG. 3, the lower bearing seat 1124 may be a separate structural member, thus the lower bearing seat 1124 may be fixed on the housing 111 by a first fastener 1161. Specifically, the first fastener 1161 passes through the lower bearing seat 1124 and connects with the first annular supporting platform 1113, to press the lower bearing seat 1124 on the first annular supporting platform 1113. Similarly, the upper bearing seat 1125 may also be a separate structural member, thus the upper bearing seat 1125 may be fixed on the housing 111 by another fastener. The lower bearing seat 1124 and the upper bearing seat 1125 may be limited on different positions of the first housing 1111 in the radial direction of the output shaft 1121.

In some embodiments, the output shaft 1121 may include a lower fixing section 11211, an upper fixing section 11212, and an intermediate fixing section 11213 between the lower fixing section 11211 and the upper fixing section 11212 along an axial direction of the output shaft 1121. An outer diameter of the intermediate fixing section 11213 may be greater than outer diameters of the lower fixing section 11211 and the upper fixing section 11212, such that the output shaft 1121 has an outer step surface 11214 between the intermediate fixing section 11213 and the lower fixing section 11211, and an outer step surface 11215 between the intermediate fixing section 11213 and the upper fixing section 11212. The rotor 1122 may be fixed on the intermediate fixing section 11213, the lower bearing 1126 and the upper bearing 1127 may sleeve on the lower fixing section 11211 and the upper fixing section 11212 respectively, the inner ring of the lower bearing 1126 may be supported on the outer step surface 11214, and the inner ring of the upper bearing 1127 may be supported on the outer step surface 11215. Furthermore, the driving assembly 112 includes a lower clamping ring 11281 connected with the lower fixing section 11211. For example, the lower clamping ring 11281 is clamped in a limiting groove of the lower fixing section 11211, and the lower clamping ring 11281 and the intermediate fixing section 11213 cooperatively clamp the inner ring of the lower bearing 1126. Similarly, the driving assembly 112 includes an upper clamping ring connected with the upper fixing section 11212, and the upper clamping ring and the intermediate fixing section 11213 cooperatively clamp the inner ring of the upper bearing 1127.

In some embodiments, the output shaft 1121 may have a hollow structure which may facilitate the wiring of the joint module 11. An inner diameter of the lower fixing section 11211 may be smaller than that of the intermediate fixing section 11213, so that an end of the lower fixing section 11211 has enough wall thickness to assemble an input shaft of the speed reduction assembly 113.

Figure 4:
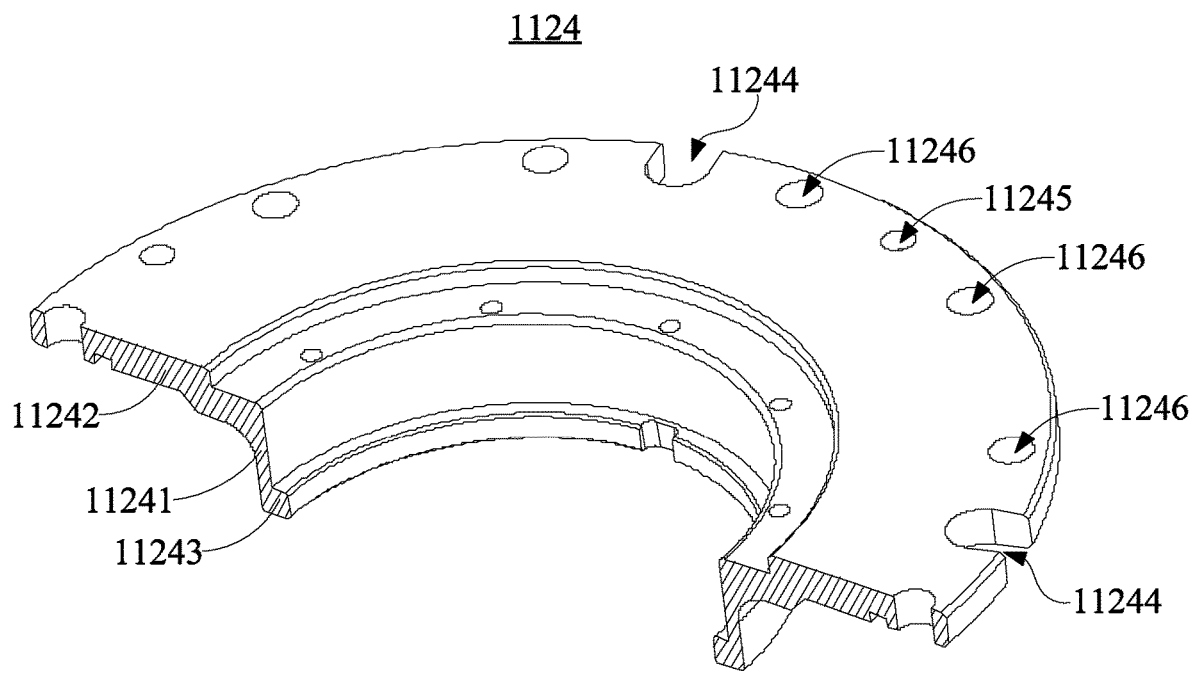
FIG. 4 is a cross sectional diagram of a lower bearing seat according to an embodiment of the present disclosure.

Illustratively, in combination with FIGS. 3 and 4, the lower bearing seat 1124 includes a lower cylindrical portion 11241, and a lower fixing portion 11242 obliquely connected with one end of the lower cylindrical portion 11241. The lower fixing portion 11242 extends towards the outside of the lower cylindrical portion 11241 to connect with the housing 111, and the lower cylindrical portion 11241 is sleeved on the lower bearing 1126. Specifically, the first fastener 1161 passes through the lower fixing portion 11242 and connects with the first annular supporting platform 1113, to press the lower bearing seat 1124 on the first annular supporting platform 1113. The lower cylindrical portion 11241 connects with the outer ring of the lower bearing 1126. One end of the first fastener 1161 that is not inserted into the first annular supporting platform 1113 may not protrude from the lower bearing seat 1124, that is, a side of the first fastener 1161 that faces the speed reduction assembly 113 may inserted into the lower bearing seat 1124 or be flush with an end face of the lower bearing seat 1124, such that it is not only convenient for subsequent assembly of the speed reduction assembly 113, but also conducive to increasing the structural compactness of the joint module 11.

In some embodiments, the lower bearing seat 1124 further includes a lower flange portion 11243 obliquely connected with the other end of the lower cylindrical portion 11241. The lower flange portion 11243 and the lower fixing portion 11242 extend in opposite directions. The outer ring of the lower bearing 1126 may be supported on the lower flange portion 11243. Based on this, the driving assembly 112 may include a lower pressing ring 11282 connected with the lower fixing portion 11242, and the lower pressing ring 11282 and the lower flange portion 11243 may cooperatively clamp the outer ring of the lower bearing 1126. The lower pressing ring 11282 may not protrude from of the lower fixing portion 11242, to avoid structural interference or collision between the lower pressing ring 11282 and structural members such as the rotor 1122.

Figure 13:
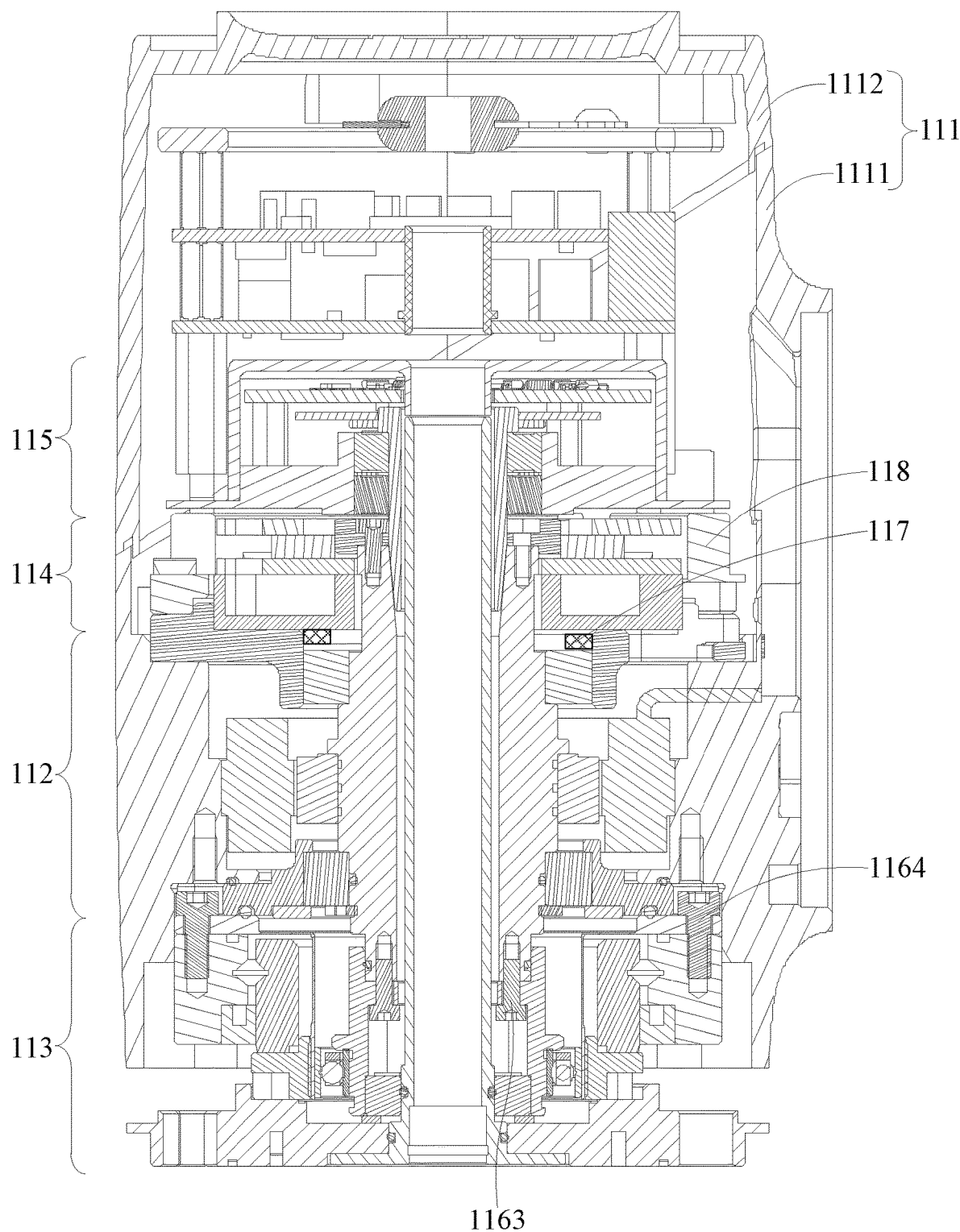
FIG. 13 is a cross sectional diagram of the joint module according to an embodiment of the present disclosure.

In some embodiments, referring to FIG. 13, the outer step surface 11214 and the lower flange portion 11243 may be arranged on a same side of the lower bearing 1126 in the axial direction of the output shaft 1121, for example, the side of the lower bearing 1126 facing the upper bearing 1127. Accordingly, the lower clamping ring 11281 and the lower pressing ring 11282 may be arranged on a same side of the lower bearing 1126 in the axial direction of the output shaft 1121, for example, the side of the lower bearing 1126 away from the upper bearing 1127. The lower bearing 1126 may be at least partially arranged on a side of the lower fixing portion 11242 towards the speed reduction assembly 113 (i.e., the other side of the lower fixing portion 11242 away from the braking assembly 114), for example, an orthographic projection of the lower bearing 1126 to the inner side of the housing 111 along the radial direction of the output shaft 1121 is partially overlapped with the first annular supporting platform 1113. A certain safety distance may exist between the rotor 1122 (or the stator 1123) and relevant structures of the lower bearing 1126 and the lower bearing seat 1124 in the radial direction of the output shaft 1121, and the relevant structures of the lower bearing 1126 and the lower bearing seat 1124 may extend into a gap between the rotor 1122 and the stator 1123 along the axial direction of the output shaft 1121, so as to avoid structural interference or collision of the relevant structures. Based on this, in case the speed reduction assembly 113 is assembled on the side where the lower bearing seat 1124 is arranged, the lower bearing 1126 may be arranged outside the speed reduction assembly 113. In this way, there is no need to consider the assembly of the lower bearing 1126 extending into the speed reduction assembly 113, so the selection of the speed reduction assembly 113 is more flexible. Furthermore, during the assembly of the driving assembly 112, the lower bearing 1126 may sleeve on the lower fixing section 11211 of the output shaft 1121 along the assembly direction, then the lower clamping ring 11281 is clamped in the limiting groove of the lower fixing section 11211, allowing the lower clamping ring 11281 and the intermediate fixing section 11213 to cooperatively clamp the inner ring of the lower bearing 1126; then the lower bearing seat 1124 sleeves on the lower bearing 1126 in an direction opposite to the assembly direction, or the lower bearing 1126 and the output shaft 1121 as a whole are inserted into the lower cylindrical portion 11241 of the lower bearing seat 1124 in the assembly direction; then the lower pressing ring 11282 is fixed on the lower fixing portion 11242 of the lower bearing seat 1124, allowing the lower pressing ring 11282 and the lower flange portion 11243 of the lower bearing seat 1124 to cooperatively clamp the outer ring of the lower bearing 1126. Obviously, no matter how the lower bearing seat 1124 and the lower bearing 1126 are assembled, the lower bearing 1126 always presses on the lower clamping ring 11281, causing the lower clamping ring 11281 bearing a greater pressure during the assembly, which brings a risk of structural failure to a certain extent.

In some embodiments, referring to FIGS. 2 and 3, the outer step surface 11214 and the lower flange portion 11243 may be respectively arranged on both sides of the lower bearing 1126 in the axial direction of the output shaft 1121. Accordingly, the lower clamping ring 11281 and the lower pressing ring 11282 may be respectively arranged on both sides of the lower bearing 1126 in the axial direction of the output shaft 1121. As such, the lower bearing 1126 may be at least partially arranged on the side of the lower fixing portion 11242 opposite to the upper bearing seat 1125, that is, the lower bearing 1126 may be at least partially arranged outside the driving assembly 112. In other words, orthographic projections of the stator 1123 and the lower bearing 1126 along the radial direction of the output shaft 1121 may not overlap with each other, that is, the stator 1123 and the lower bearing 1126 are spaced from each other in the axial direction of the output shaft 1121. Based on this, in case the speed reduction assembly 113 is assembled on the side where the lower bearing seat 1124 is arranged, the lower bearing 1126 may be at least partially arranged in the speed reduction assembly 113. In this way, there is no need to worry about the structural interference or collision between the relevant structures of the lower bearing 1126 and the lower bearing seat 1124 and the rotor 1122 or the stator 1123, and the driving assembly 112 is more compact in the axial and radial directions of the output shaft 1121, so the driving assembly 112 can be provided with a larger rotor 1122 or stator 1123. Furthermore, during the assembly of the driving assembly 112, the lower bearing 1126 is sleeved on the lower fixing section 11211 of the output shaft 1121 along the assembly direction, then the lower clamping ring 11281 is clamped in the limiting groove of the lower fixing section 11211, allowing the lower clamping ring 11281 and the intermediate fixing section 11213 to cooperatively clap the inner ring of the lower bearing 1126; then, the lower bearing seat 1124 sleeves on the lower bearing 1126 along the assembly direction, or the lower bearing 1126 and output shaft 1121 as a whole is embedded in the lower cylindrical portion 11241 of the lower bearing seat 1124 along the direction opposite to the assembly direction, then the lower pressing ring 11282 is fixed on the lower fixing portion 11242 of the lower bearing seat 1124, allowing the lower pressing ring 11282 and the lower flange portion 11243 of the lower bearing seat 1124 to cooperatively clamp the outer ring of the lower bearing 1126. Obviously, no matter how the lower bearing seat 1124 and the lower bearing 1126 are assembled, the lower bearing 1126 always presses on the lower fixing section 11211 rather than the lower clamping ring 11281, so that the lower clamping ring 11281 bears no pressure during the assembly process, which is conducive to ensuring the reliability of the lower clamping ring 11281.

Figure 5:
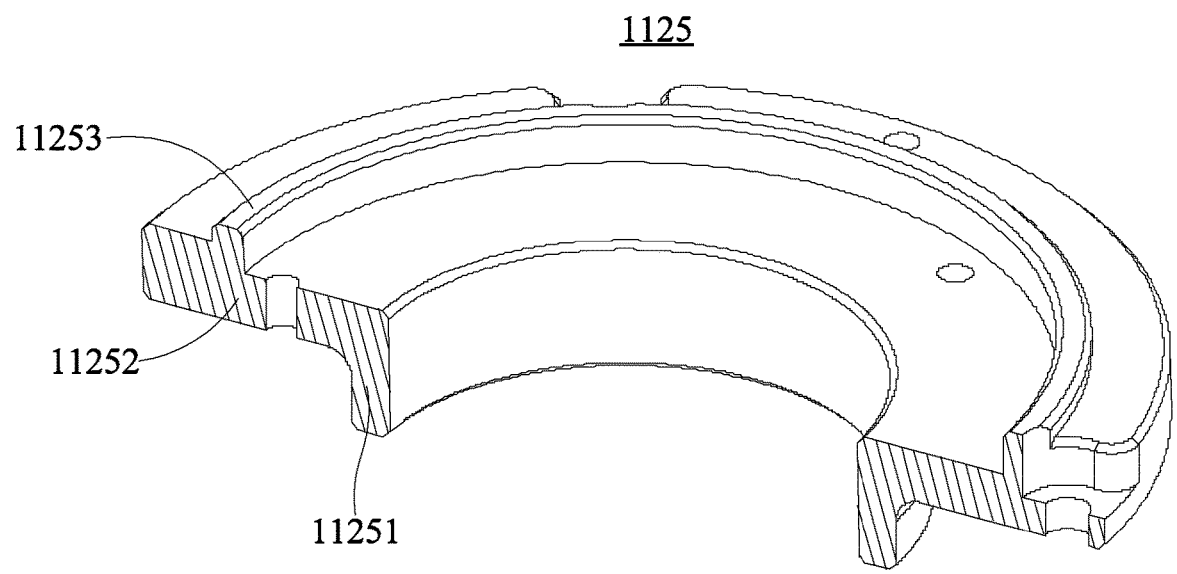
FIG. 5 is a cross sectional diagram of an upper bearing seat according to an embodiment of the present disclosure.

Illustratively, in combination with FIGS. 3 and 5, the upper bearing seat 1125 includes an upper cylindrical portion 11251 and an upper fixing portion 11252 obliquely connected with one end of the upper cylindrical portion 11251. The upper fixing portion 11252 extends to the outside of the upper cylindrical portion 11251 to connect with the housing 111, and the upper cylindrical portion 11251 sleeves on the upper bearing 1127. Specifically, a fastener passes through the upper fixing portion 11252 and connects with the first annular supporting platform 1113, to press the upper bearing seat 1125 on the first annular supporting platform 1113. The upper cylindrical portion 11251 is connected with the outer ring of the upper bearing 1127. The upper bearing 1127 is at least partially arranged in the driving assembly 112, which facilitates subsequent assembly of structural members such as the braking assembly 114. Furthermore, orthographic projections of the upper bearing 1127 and the stator 1123 along the radial direction of the output shaft 1121 may be partially overlapped with each other, for example, the relevant structures of the upper bearing 1127 and the upper bearing seat 1125 extend into the gas existed between the output shaft 1121 and the stator 1123 along the axial direction of the output shaft 1121, which may not only avoid structural interference or collision of the relevant structural members, but also help to increase the structural compactness of the joint module 11.

In some embodiments, the upper bearing seat 1125 includes an upper annular limiting portion 11253 connected with the upper fixing portion 11252, and the upper annular limiting portion 11253 is capable of limiting structural members such as the braking assembly 114 along the radial direction of the output shaft 1121, which will be described below.

Based on the above related description and in combination with FIGS. 2 to 6, the housing 111 may also served as the housing of the driving assembly 112, so that performance test can be carried out after each component of the driving assembly 112 is assembled on the housing 111. The first fastener 1161 is configured to fix the lower bearing seat 1124 on the housing 111, and the upper bearing seat 1125 may also be fixed on the housing 111 by another fastener. Based on this, the second fastener 1162 may fix the speed reduction assembly 113 on the housing 111 and pass through the lower bearing seat 1124; the third fastener 1163 may fix the input shaft 1131 of the speed reduction assembly 113 on the output shaft 1121. In other words, the driving assembly 112 may be detachably connected with the housing 111 through the first fastener 1161, and the speed reduction assembly 113 may be detachably connected with the housing 111 and the driving assembly 112 through the second fastener 1162 and the third fastener 1163, respectively, making each structural member of the joint module 11 be modularity. In related art, the output shaft of the driving assembly 112 and the input shaft of the speed reduction assembly 113 are integrated. For example, the rotor 1122 of the driving assembly 112 is fixed on the input shaft of the speed reduction assembly 113, that is, the driving assembly 112 does not have an independent output shaft, so it is difficult to perform performance tests on the drive assembly 112. Different from related art, in the present disclosure, the output shaft 1121 of the driving assembly 112 and the input shaft 1131 of the speed reduction assembly 113 are separate structural members and are detachably connected by the third fastener 1163, so performance tests can be respectively carried out on the driving assembly 112 and the speed reduction assembly 113 before assembly, and it is also conductive to the maintain in later, as well as the reducing of the vibration and noise of the speed reduction assembly 113.

Illustratively, the first fastener 1161 passes through the lower fixing portion 11242 and connects with the first annular supporting platform 1113, to press the lower bearing seat 1124 on the first annular supporting platform 1113. The second fastener 1162 passes through the speed reduction assembly 113 and the lower fixing portion 11242 successively and connects with the first annular supporting platform 1113, to press the speed reduction assembly 113 and the lower bearing seat 1124 on the first annular supporting platform 1113, that is, the speed reduction assembly 113 and the lower bearing seat 1124 are fixed on the first annular supporting platform 1113 by the second fastener 1162. Furthermore, the input shaft 1131 has a hollow structure, which facilitates the wiring of the joint module 11. The inner side of the input shaft 1131 is provided with a second annular supporting platform 11311. The output shaft 1121 is inserted into the input shaft 1131, and the end face of the output shaft 1121 is resisted against the second annular supporting platform 11311. The third fastener 1163 connects the second annular supporting platform 11311 and the output shaft 1121 along the axial direction of the output shaft 1121, that is, the third fastener 1163 fixes the input shaft 1131 on the end of the lower fixing section 11211. In this way, the output shaft 1121 can be limited by the input shaft 1131 in radial direction, and the coaxiality between the input shaft 1131 and the output shaft 1121 is also increased.

In some embodiments, the output shaft 1121 extends out of the lower bearing seat 1124, and a mounting surface between the input shaft 1131 and the output shaft 1121 is arranged in the speed reduction assembly 113 in the axial direction of the output shaft 1121, so that relevant structures of the lower bearing 1126 and the lower bearing seat 1124 may be at least partially arranged in the speed reduction assembly 113.

Figure 6:
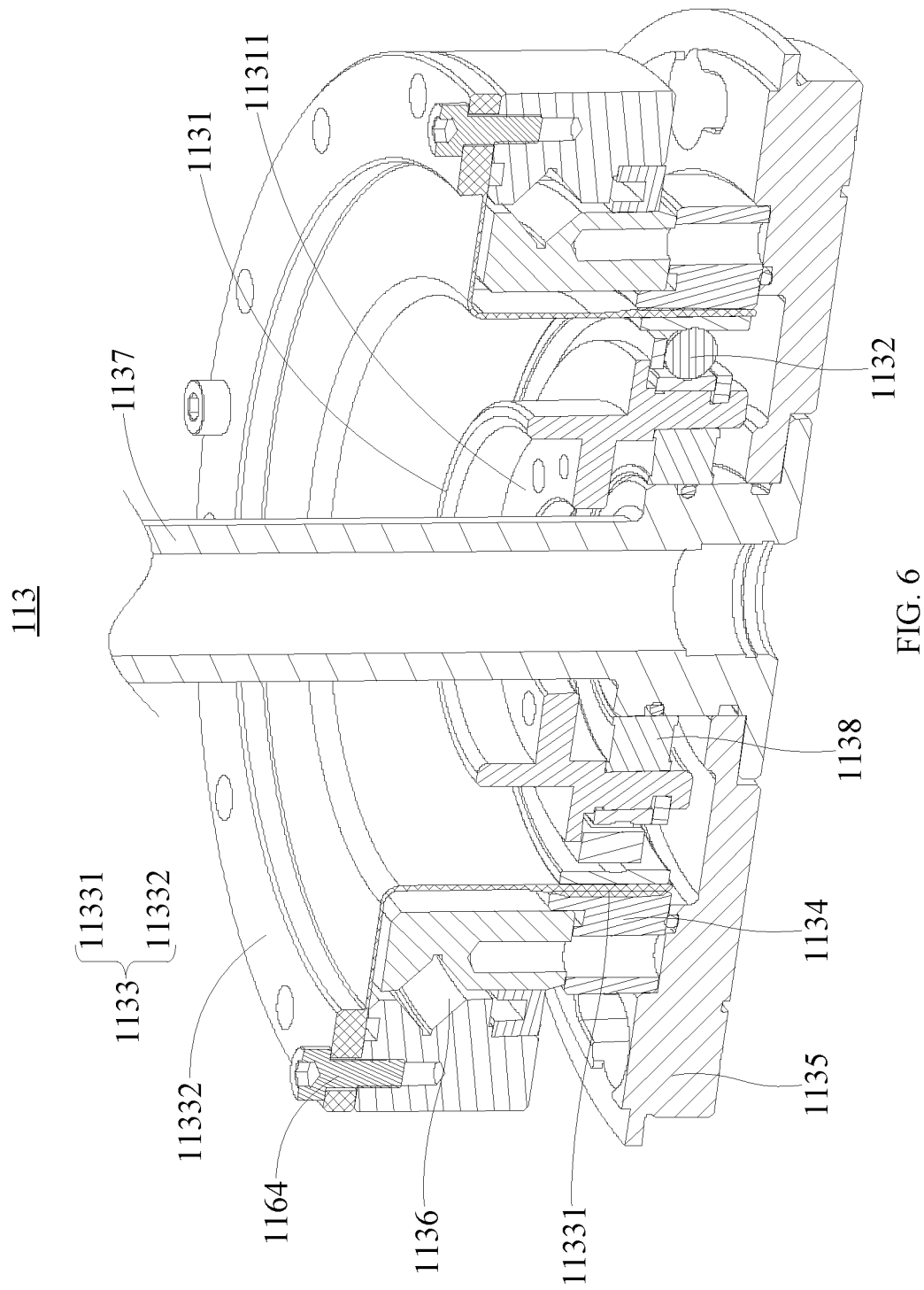
FIG. 6 is a cross sectional diagram of a speed reduction assembly according to an embodiment of the present disclosure.

Illustratively, in combination with FIGS. 2 and 6, the speed reduction assembly 113 includes a wave generator 1132 connected to the input shaft 1131, a flexible wheel 1133 sleeved on the wave generator 1132, and a rigid wheel 1134 sleeved on the flexible wheel 1133. The rigid wheel 1134 is partially engaged with the flexible wheel 1133 to facilitate achieving a corresponding transmission ratio for the speed reduction assembly 113. Furthermore, the speed reduction assembly 113 includes a flange plate 1135, the flange plate 1135 may be served as an output end of the speed reduction assembly 113 to connect with other joint modules 11 or connecting arms 12.

In some embodiments, the flexible wheel 1133 may have a cylindrical structure. Based on this, a side wall of the flexible wheel 1133 is partially engaged with the rigid wheel 1134, and a bottom wall of the flexible wheel 1133 is connected with the flange plate 1135. Accordingly, the rigid wheel 1134 may be fixed on the first annular supporting platform 1113 by the second fastener 1162.

In some embodiments, the flexible wheel 1133 may be a hollow top-hat structure. Based on this, the speed reduction assembly 113 includes an outer bearing 1136, and the flexible wheel 1133 includes a cylindrical engaging portion 11331 and an annular bending portion 11332 obliquely connected with one end of the cylindrical engaging portion 11331. The annular bending portion 11332 extends to the outside of the cylindrical engaging portion 11331. The cylindrical engagement part 11331 is partially engaged with the rigid wheel 1134, the annular bending portion 11332 is connected with an outer ring of the outer bearing 1136, and the rigid wheel 1134 is connected with an inner ring of the outer bearing 1136. And, the second fastener 1162 fixes one of the inner ring and the outer ring of the outer bearing 1136 on the first annular supporting platform 1113, and the flange plate 1135 is connected with the other one of the inner ring and the outer ring of the outer bearing 1136.

Based on the above related description, and in combination with FIGS. 2, 3 and 6, the relevant structures of the lower bearing 1126 and the lower bearing seat 1124 may be at least partially arranged in the speed reduction assembly 113. For example, the lower bearing 1126 is arranged on an inner side of the flexible wheel 1133 opposite to the rigid wheel 1134 in the radial direction of the output shaft 1121, causing the lower bearing 1126 to occupy an internal space of the speed reduction assembly 113 to a certain extent. Based on this, in order to avoid structural interference or collision between the relevant structures of the lower bearing 1126 and the lower bearing seat 1124, and the flexible wheel 1133 or the input shaft 1131, it is easy for those skilled in the art to come up with the following technical solution: a radial size of the speed reduction assembly 113 is increased to increase a gap between the flexible wheel 1133 and the input shaft 1131 along a radial direction of the output shaft 1121 to ensure a sufficient safety distance. The difference of the present disclosure is, in combination with FIG. 4, a thickness of the lower cylindrical portion 11241 in the radial direction of the output shaft 1121 is smaller than a thickness of the lower flange portion 11243 in the axial direction of the output shaft 1121 and a thickness of the lower fixing portion 11242 in the axial direction of the output shaft 1121, that is, the lower cylindrical portion 11241 is thinned, which may not only avoid the aforementioned interference or collision, but also balance the radial size of the speed reduction assembly 113. Corners of the lower cylindrical portion 11241 and the lower fixing portion 11242 opposite to the lower bearing 1126 may have a circular shape to avoid a large stress concentration, thereby increasing the structural strength and reliability of the lower bearing seat 1124.

In some embodiments, referring to FIG. 6, the speed reduction assembly 113 includes a hollow shaft 1137 and an inner bearing 1138. One end of the hollow shaft 1137 is connected to the flange plate 1135, and an inner ring and an outer ring of the inner bearing 1138 are respectively connected to the hollow shaft 1137 and the input shaft 1131. In combination with FIG. 2, the hollow shaft 1137 successively passes through the input shaft 1131, the output shaft 1121, and the braking assembly 114 until the hollow shaft 1137 is inserted into the encoding assembly 115. In this way, it is not only convenient to set the wiring structure of the joint module 11, but also conducive to reducing a wear of the wiring structure. In addition, it is also convenient for the encoding assembly 115 to detect the rotation speed and/or angular position of the output end (such as the flange plate 1135) of the speed reduction assembly 113.

Illustratively, in combination with FIGS. 6 and 2, the second fastener 1162 fixes the outer ring of the outer bearing 1136 on the first annular supporting platform 1113, and the flange plate 1135 is connected with the inner ring of the outer bearing 1136 by the rigid wheel 1134. The fourth fastener 1164 may fix the annular bending portion 11332 on the outer ring of the outer bearing 1136, to allow performance test being carried out on the speed reduction assembly 113. The second fastener 1162 passes through the outer ring of the outer bearing 1136, the annular bending portion 11332, and the lower bearing seat 1124 in sequence, and connects with the first annular supporting platform 1113, to press the speed reduction assembly 113 and the lower bearing seat 1124 on the first annular supporting platform 1113. Further, in combination with FIG. 4, the lower bearing seat 1124 (specifically the lower fixing portion 11242) defines an avoiding hole 11244, and a part of the fourth fastener 1164 protruding the annular bending portion 11332 may be arranged in the avoiding hole 11244 to increase the structural compactness of the joint module 11. Preferably, the avoiding hole 11244 may pass through the lower fixing portion 11242 along the axial direction of the output shaft 1121 to allow the fourth fastener 1164 to contact the first annular supporting platform 1113 through the avoiding hole 11244, which is conducive to heat dissipation of the speed reduction assembly 113, thereby increasing the reliability of the speed reduction assembly 113.

In some embodiments, in combination with FIGS. 2, 3 and 6, the assembly direction of the fourth fastener 1164 is opposite to the assembly direction of the first fastener 1161, and the assembly direction of the second fastener 1162 is the same as the assembly direction of the first fastener 1161, so each component of the driving assembly 112 and the speed reduction assembly 113 can be assembled with the housing 111 in a certain order.

In some embodiments, there may be a plurality of the first fasteners 1161, the second fasteners 1162, and the fourth fasteners 1164 which are spaced apart from each other around the output shaft 1121. Between each two adjacent fourth fasteners 1164 around the output shaft 1121, the second fasteners 1162 are more than the first fasteners 1161. In this way, the first fastener 1161 may fix the lower bearing seat 1124 on the first annular supporting platform 1113, the number of the first fastener 1161 just need to meet the requirements of capable of carrying out a separate performance test on the driving assembly 112; the fourth fastener 1164 may fix the annular bending portion 11332 on the outer ring of the outer bearing 1136, the number of the fourth fastener 1164 just need to meet the requirements of capable of carrying out a separate performance test on the speed reduction assembly 113. Finally, the speed reduction assembly 113 and the lower bearing seat 1124 are both firmly fixed on the first annular supporting platform 1113 by a large number of second fasteners 1162, so as to simplify the structure to the greatest extent and balance the reliability of the structure.

Illustratively, the quantity of the first fastener 1161 may be four, the quantity of the second fastener 1162 may be twelve, and the quantity of the fourth fastener 1164 may be four. Since the first fastener 1161, the second fastener 1162, and the fourth fastener 1164 are directly or indirectly related to the lower bearing seat 1124 in structure, their quantities can be characterized by the quantity of corresponding through holes in the lower fixing portion 11242. Based on this, in combination with FIG. 4, in addition to the avoiding hole 11244 corresponding to the fourth fastener 1164, the lower fixing portion 11242 may further define a recessing hole 11245 corresponding to the first fastener 1161 and a through hole 11246 corresponding to the second fastener 1162. Obviously, the quantities of the avoiding holes 11244, the recessing holes 11245, and the through holes 11246 are four, four, and twelve, respectively. It should be noted that since the speed reduction assembly 113 needs to be assembled at the side where the lower bearing seat 1124 is arranged, a side of the first fastener 1161 facing the speed reduction assembly 113 may be inserted into the lower bearing seat 1124 or be flush with an end face of the lower bearing seat 1124. Obviously, the recessing hole 11245 may receive the first fastener 1161 better. Further, a distance between the first fastener 1161 and a center of the lower bearing seat 1124 may be less than a distance between the second fastener 1162 to a center of the lower bearing seat 1124 along the axial direction of the output shaft 1121. That is, the first fastener 1161 is closer to the output shaft 1121 along the radial direction of the output shaft 1121 than the second fastener 1162. In other words, along the radial direction of the output shaft 1121, the recessing hole 11245 is closer to the center of the lower bearing 1126 and further away from the edge of the lower fixing portion 11242 than the through hole 11246, which is conducive to ensuring the structural strength of the area of the lower fixing portion 11242 where the recessing hole 11245 is arranged, thereby increasing the structural reliability of the driving assembly 112.

It should be noted that, in other embodiment, the driving assembly 112 and/or the speed reduction assembly 113 does not require a separate performance test, the first fastener 1161 and the fourth fastener 1164 may be omitted, that is, only the second fastener 1162 is configured to assemble each component of the driving assembly 112 and the speed reduction assembly 113 with the housing 111.

In combination with FIG. 3, both ends of the output shaft 1121 are connected with the housing 111 through respect the lower bearing 1126 and the upper bearing 1127, so the driving assembly 112 can give a much more stable output. Therefore, each of the lower bearing 1126 and the upper bearing 1127 needs to define a certain clearance after being assembled. However, if the clearance is too small, the output shaft 1121 cannot rotate smoothly; on the contrary, if the clearance is too large, the output shaft 1121 cannot rotate stably (such as "displace"). For this reason, the joint module 11 may include a first elastic member 117 which may press the outer ring of the upper bearing 1127, so the clearance between the lower bearing 1126 and the upper bearing 1127 can be controlled within a reasonable range. The first elastic member 117 may be a wave spring. Based on this, in order to press the first elastic member 117, it is easy for those skilled in the art to come up with the following technical solution: an additional upper pressing ring connected with the upper bearing seat 1125 is provided to press the first elastic member 117. The difference of the present disclosure is that, in combination with FIGS. 2 and 3, the braking assembly 114 is fixed on the upper bearing seat 1125 and simultaneously presses the first elastic member 117 on the outer ring of the upper bearing 1127, that is, the braking assembly 114 may replace the upper pressing ring, so that the clearance between the lower bearing 1126 and the upper bearing 1127 may be controlled within a reasonable range, and the upper pressing ring may be omitted, thus the joint module 11 is much more compact in structure, and the cost of the joint module 11 is also reduced.

Figure 7:
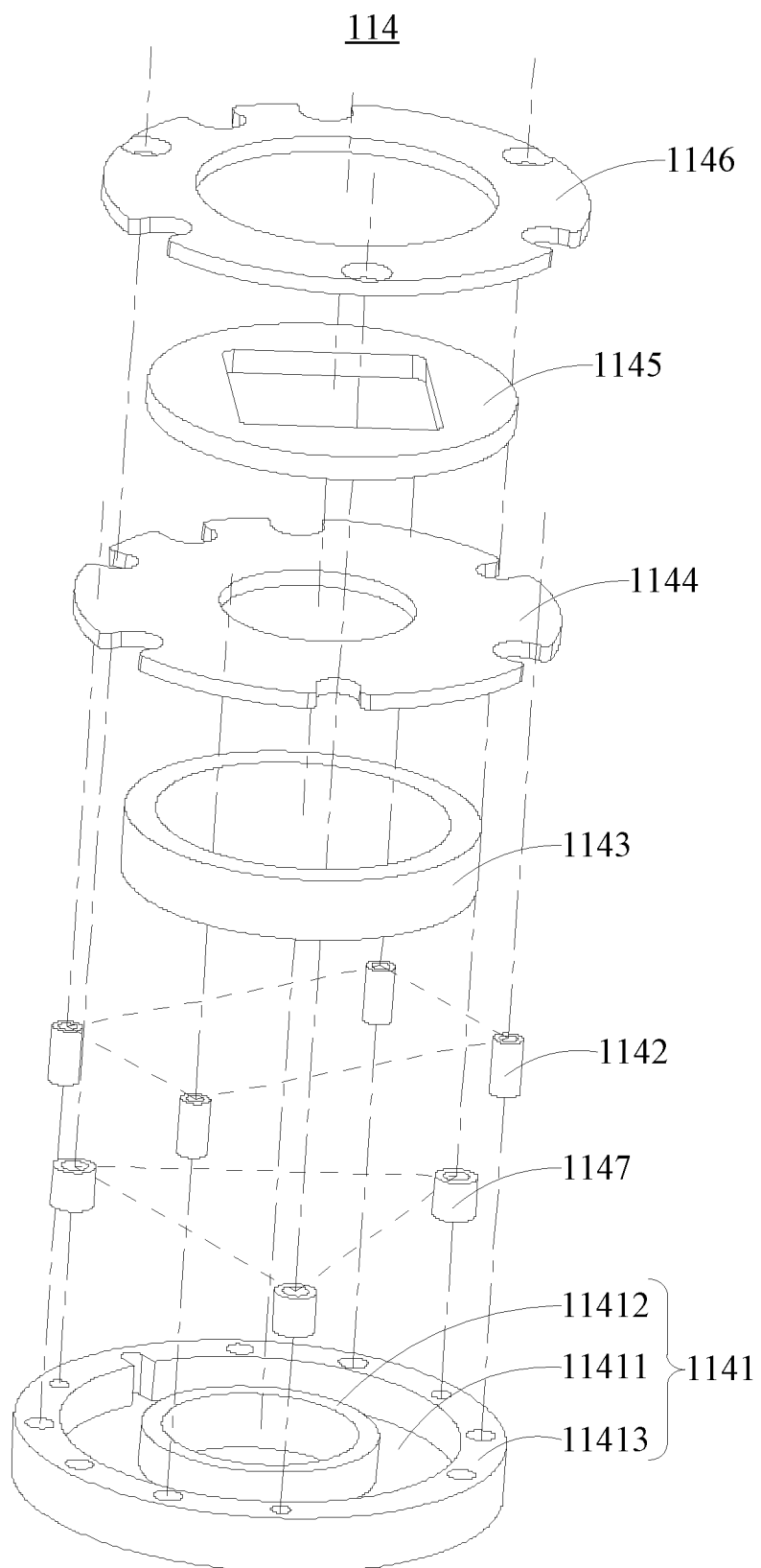
FIG. 7 is an exploded diagram of a braking assembly according to an embodiment of the present disclosure.

Illustratively, with reference to FIG. 7, the braking assembly 114 includes a mounting seat 1141 connected to the upper bearing seat 1125, a second elastic member 1142 and a magnet exciting coil 1143 both arranged in the mounting seat 1141, and an armature plate 1144, a friction plate 1145 and a cover plate 1146 which are arranged layer by layer in sequence along the axial direction of the output shaft 1121. That is, the armature plate 1144 and the cover plate 1146 are respectively arranged on both sides of the friction plate 1145 in the axial direction of the output shaft 1121. The friction plate 1145 is connected with the output shaft 1121 to rotate along with the output shaft 1121. The cover plate 1146 may be connected with the mounting base 1141 to remain relatively stationary. The armature plate 1144 and the friction plate 1145 may be separate members, that is, the armature plate 1144 and the friction plate 1145 is capable of moving to each other. The armature plate 1144 and the friction plate 1145 may also be connected with each other by at least one of the assembly methods including gluing, clamping, and threaded connection, that is, the armature plate 1144 and the friction plate 1145 may remain relatively stationary.

Figure 8:
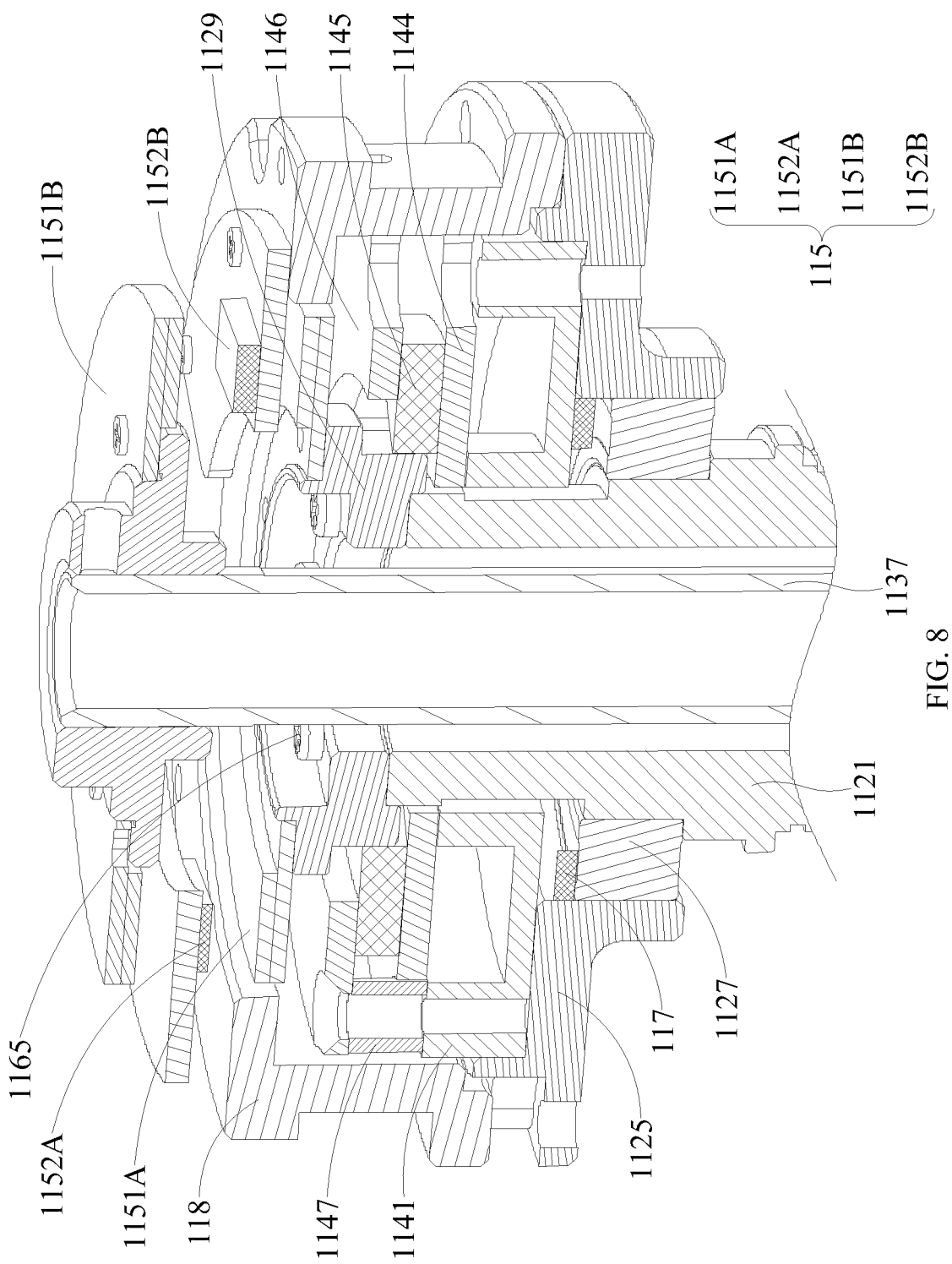
FIG. 8 is a cross sectional diagram of the braking assembly and an encoding assembly according to an embodiment of the present disclosure.

The working principle of the braking assembly 114 may be that: in combination with FIG. 8, when the magnet exciting coil 1143 is powered off, the armature plate 1144 pushes the friction plate 1145 to move along the axial direction of the output shaft 1121 to contact the cover plate 1146 under the elastic force of the second elastic member 1142, so that the output shaft 1121 switches from the rotating state to the braking state, that is, the output shaft 1121 stops rotating; when the magnet exciting coil 1143 is energized, magnetic field is generated by the magnet exciting coil 1143 to act on the armature plate 1144, making the friction plate 1145 separate from the cover plate 1146 to release the braking state of the output shaft 1121, that is, the output shaft 1121 continues to rotate. In this way, compared with the related art in which the output shaft 1121 is braked by a pin, the braking assembly 114 in the present disclosure brakes the output shaft 1121 by the friction resistance, the braking assembly 114 in the present disclosure has the advantages of no idle stroke, fast response, no abnormal noise, etc. After the magnet exciting coil 1143 is powered off, the elastic potential energy stored in the second elastic member 1142 may not only push the armature plate 1144 and the friction plate 1145, but also allow a certain positive pressure to be generated between the armature plate 1144 and the friction plate 1145, and between the friction plate 1145 and the cover plate 1146, thus a preset friction resistance can be provided to maintain the braking state of the output shaft 1121. Further, after the magnet exciting coil 1143 is energized, the magnetic field generated by the magnet exciting coil 1143 may attract the armature plate 1144 to keep the armature plate 1144 away from the cover plate 1146, so as to at least release the positive pressure between the friction plate 1145 and the cover plate 1146.

It should be noted that, after the braking assembly 114 is assembled, the mounting base 1141 is fixed on the upper fixing portion 11252, and the braking assembly 114 presses the first elastic member 117 through the mounting base 1141. Correspondingly, the second elastic member 1142 is arranged on the side of the mounting base 1141 that is away from the first elastic member 117; the mounting base 1141 is limited on the inner side of the upper ring shaped limiting portion 11253 along radial direction. In some embodiments, the mounting base 1141 may be made of soft magnetic material which is the same as the armature plate 1144, so as to adjust the magnetic field generated by the magnet exciting coil 1143 to make the magnetic field be more concentrated.

The braking assembly 114 includes a guiding column 1147 supported between the mounting base 1141 and the cover plate 1146. The armature plate 1144 may be close to or far from the cover plate 1146 under the guidance of the guiding column 1147 to avoid the braking assembly 114 from being stuck. The quantity of guiding column 1147 may be more than one, and the guiding columns 1147 may be spaced apart from each other around the output shaft 1121, for example, three guiding columns 1147 may be evenly spaced apart from each other around the output shaft 1121.

In some embodiments, the mounting base 1141 includes a bottom wall 11411, an inner wall 11412 and an outer wall 11413 both connected with the bottom wall 11411. The inner wall 11412 is arranged around the output shaft 1121, and the outer wall 11413 is arranged around the inner wall 11412 and extends in a same direction as the inner wall 11412. Correspondingly, the guiding column 1147 may be supported between the outer wall 11413 and the cover plate 1146. Based on this, the armature plate 1144 may be stopped by at least one of the inner wall 11412 and the outer wall 11413 when the armature plate 1144 is far away from the cover plate 1146 under the action of the magnetic field generated by the magnet exciting coil 1143, so as to limit the movement of the armature plate 1144.

In some embodiments, the second elastic member 1142 is arranged in a blind hole defined in the outer wall 11413, and the magnet exciting coil 1143 is arranged between the inner wall 11412 and the outer wall 11413, for example, the magnet exciting coil 1143 is wound on the inner wall 11412. The quantity of the second elastic members 1142 may be more than one, and the second elastic members 1142 is spaced apart from each other around the output shaft 1121, for example, four second elastic members 1142 is evenly spaced apart from each other around the output shaft 1121.

In some embodiments, the second elastic member 1142 and the magnet exciting coil 1143 is arranged between the inner wall 11412 and the outer wall 11413. For example, the quantities of the second elastic member 1142 and the magnet exciting coil 1143 are more than one, and the second elastic members 1142 and the excitation coils 1143 are respectively spaced apart from each other around the output shaft 1121.

Figure 9:
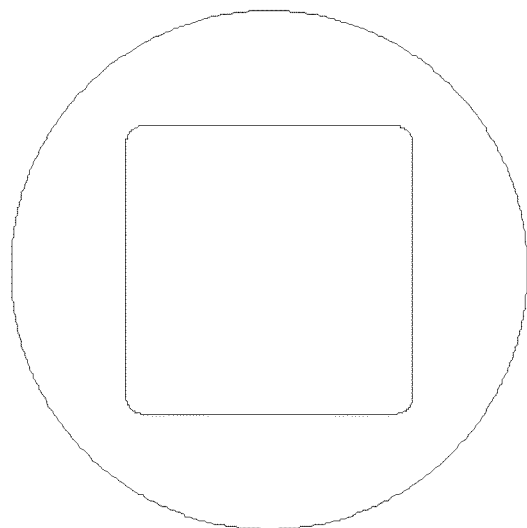
FIG. 9 is a top plan view of a friction plate according to an embodiment of the present disclosure.
Figure 10:
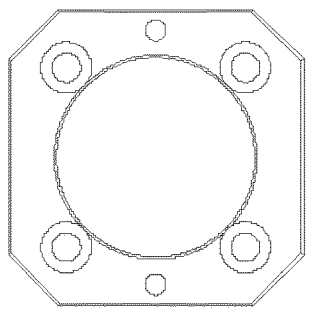
FIG. 10 is a top plan view of an adapter according to an embodiment of the present disclosure.

In combination with FIG. 8, the driving assembly 112 includes an adapter 1129 connected with the output shaft 1121, and the friction plate 1145 is sleeved on the adapter 1129. In combination with FIGS. 9 and 10, viewed along the axial direction of the output shaft 1121, an outer contour of the adapter 1129 and an inner contour of the friction plate 1145 are matched with each other and are non-circular, to allow the friction plate 1145 to rotate with the adapter 1129, and allow the friction plate 1145 to move relative to the adapter 1129 along the axial direction of the output shaft 1121. For example, the inner contour of the friction plate 1145 is a first square when viewed along the axial direction of the output shaft 1121, and the four corners of the first square are rounded corners; the outer contour of the adapter 1129 is a second square when viewed along the axial direction of the output shaft 1121, and the four corners of the second square are rounding chamfer. In this way, the corners of the adapter 1129 may effectively avoid the corners of the friction plate 1145, so as to prevent the friction plate 1145 from getting stuck when moving along with the adapter 1129, so the reliability of the braking assembly 114 is improved, further, the area of the friction plate 1145 may be increased as much as possible, so that the braking assembly 114 can respond faster.

When the output shaft 1121 is switched from the braking state to the rotating state, the friction plate 1145 rotates with the adapter 129, then rotates with the output shaft 1121, to prevent the braking assembly 114 from applying unnecessary resistance to the rotation of the output shaft 1121; when the output shaft 1121 is switched from the rotating state to the braking state, the friction plate 1145 moves along the axial direction of the output shaft 1121 with respect to the adapter 1129 under the push of the second elastic member 1142 and the armature plate 1144, to contact the cover plate 1146, then the output shaft 1121 is stopped by the friction resistance. In other words, the adapter 1129 has no freedom relative to the output shaft 1121, while the friction plate 1145 has freedom relative to the adapter 1129 along the axial direction of the output shaft 1121. In this way, compared with that the adapter 1129 is integratedly formed with the output shaft 1121, the adapter 1129 and the output shaft 1121 are separately processed and then assembled, which not only simplifies the structure of the output shaft 1121 and reduces the difficulty of processing the output shaft 1121, but also facilitates the selection of different materials for the adapter 1129 and the output shaft 1121 for reducing the cost of the joint module 11.

In some embodiments, in combination with FIG. 8, the encoding assembly 115 may be configured to detect the rotation state (including at least one of the rotation speed and the angular position of the output shaft 1121) of the driving assembly 112. The encoding assembly 115 includes an encoding disk 1151A and a reading head 1152A which cooperates with the encoding disk 1151A to detect the rotation speed and/or the angular position of the output shaft 1121. Based on this, the encoding assembly 115 may be a magneto-electric encoder, and the encoding disk 1151A is correspondingly set as a magnetic grid disk; the encoding assembly 115 may also be a photoelectric encoder, and the encoding disk 1151A is correspondingly set as a grating disk. Both the magneto-electric encoder and the photoelectric encoder may be further arranged as the incremental or absolute type according to the actual needs. The relevant principles and specific structures are well known to those skilled in the art, and will not be repeated here. It is worth noting that compared with the magneto-electric encoder, the photoelectric encoder has more stringent requirements on the external environment. For example, the photoelectric encoder has higher dust prevention requirements, which will be explained later.

In some embodiments, the encoding disc 1151A and the adapter 1129 may be separately connected with the output shaft 1121 to rotate with the output shaft 1121, so the interference of the braking assembly 114 to the encoding assembly 115 is reduced. Illustratively, the encoding disk 1151A and the adapter 1129 may be connected with the output shaft 1121 through their respective adapters, and the quantity of adapters is two.

In some embodiments, the encoding disk 1151A connects with the adapter 1129, and the encoding disk 1151A connects with the output shaft 1121 by the adapter 1129. That is, the encoding disk 1151A and the friction plate 1145 both connect with the output shaft 1121 by the adapter 1129, so that the adapter 1129 has two functions, which is conducive to simplifying the structure of the joint module 11. Based on this and in combination with FIG. 8, after the driving assembly 112 is assembled with the housing 111, the braking assembly 114 is assembled with the driving assembly 112 first; then the encoding disc 1151A and the adapter 1129 as a whole is assembled with the braking assembly 114; and the bracket 118, the reading head 1152A and the circuit board of the reading head 1152A, and other structures as a whole are assembled with the housing 111 or the upper bearing seat 1125. In this way, compared with the encoding disk 1151A and the adapter 1129 connected with the output shaft 1121 by their respective adapters, both the encoding disk 1151A and the friction plate 1145 in the present disclosure are connected with the output shaft 1121 by the adapter 1129, so the adapter 1129 only needs to be assembled and disassembled once, which is beneficial to improve the production efficiency.

Figure 11:
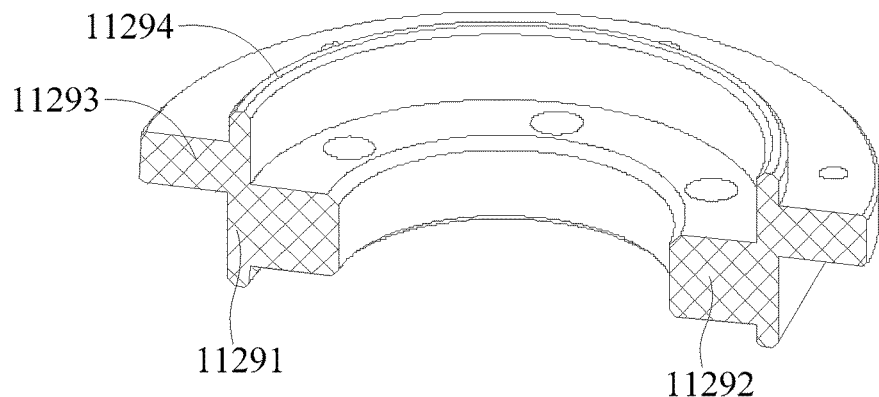
FIG. 11 is a cross sectional diagram of the adapter according to an embodiment of the present disclosure.

Illustratively, in combination with FIG. 11, the adapter 1129 includes a cylindrical body 11291, an inner flange portion 11292 and an outer flange portion 11293 both connected with the cylindrical body 11291, and the outer flange portion 11293 and the inner flange portion 11292 extend in reverse directions. In combination with FIG. 10, the outer contour of the cylindrical body 11291 is non-circular but a square with four chamfering corners when viewed along the axial direction of the output shaft 1121, and the friction plate 1145 sleeves on the cylindrical body 11291 to rotate with the adapter 1129 or move along the axial direction of the output shaft 1121 relative to the adapter 1129; the encoding disc 1151A connects with the outer flange portion 11293 to rotate with the adapter 1129. Preferably, the adapter 1129 includes an annular flange 11294 connected with the outer flange portion 11293. When the encoding disk 1151A connects with the outer flange portion 11293, the encoding disk 1151A further sleeves on the annular flange 11294 to limit the encoding disk 1151A in radial direction by the annular flange 11294. Further, with reference to FIG. 8, the output shaft 1121 is inserted into the cylindrical body 11291, and the end face of the output shaft 1121 butts with the inner flange portion 11292. For example, the inner flange portion 11292 is fixed on the end of the upper fixing section 11212 by the fifth fastener 1164 to allow the adapter 1129 to rotate with the output shaft 1121. Since the output shaft 1121 is inserted into the cylindrical body 11291, the cylindrical body 11291 may limit the output shaft 1121 in radial direction, and the coaxiality between the adapter 1129 and the output shaft 1121 is also increased.

It should be noted that the first fastener to the fifth fastener in the present disclosure may be bolts, for example, hexagon heads bolts, round heads bolts, square heads bolts, or countersunk heads bolts, etc.

In some embodiments, in combination with FIG. 8, the encoding assembly 115 may be configured to detect the rotation state (including at least one of the rotation speed and angular position of the flange plate 1135) of the speed reduction assembly 113. The encoding assembly 115 includes an encoding disk 1151B connected with the hollow shaft 1137 and a reading head 1152B matched with the encoding disk 1151B. The reading head 1152B detects the rotation speed and/or the angular position of the flange plate 1135 when the encoding disk 1151B rotates with the hollow shaft 1137. Similarly, the encoding disk 1151B may be a magnetic grating disk or a grating disk.

Illustratively, in combination with FIGS. 5 and 8, the joint module 11 includes a bracket 118 connected with the housing 111, and the bracket 118 covers the braking assembly 114, that is, the bracket 118 is arranged outside of the braking assembly 114, so as to facilitate the arrangement of the encoding assembly 115, and further simplify the structure of the joint module 11. In other words, the bracket 118 and the braking assembly 114 are supported on a same side of the upper fixing portion 11252. The reading head 1152A and its circuit board are connected with the bracket 118, and the reading head 1152B and its circuit board are also connected with the bracket 118. In this way, it is beneficial to adjust the axial spacing between the reading head 1152A and the encoder 1151A along the axial direction of the output axis 1121, and the axial spacing between the reading head 1152B and the encoder 1151B along the axial direction of the output axis 1121, thereby increasing the reliability of the encoder assembly 115. Of course, the reading head 1152A and the reading head 1152B may also be set on a same circuit board, and the encoding disk 1151A, the circuit board and the encoding disk 1151B are set at intervals along the axial direction of the output shaft 1121, which is conducive to simplifying the structure of the encoding assembly 115.

In some embodiments, in the radial direction of the output shaft 1121, the braking assembly 114 is limited to the inner side of the upper annular limiting portion 11253, and the bracket 118 is limited to the outer side of the upper annular limiting portion 11253, which is not only conducive to improving the assembly accuracy of the braking assembly 114 and the bracket 118, but also conducive to simplifying the structure of the joint module 11. In the axial direction of the output shaft 1121, compared with the outer support surface of the upper fixing portion 11252 for supporting the bracket 118, the inner support surface of the upper fixing portion 11252 for supporting the braking assembly 114 is closer to the upper bearing, which is conducive to increasing the structural compactness of the joint module 11.

Figure 12:
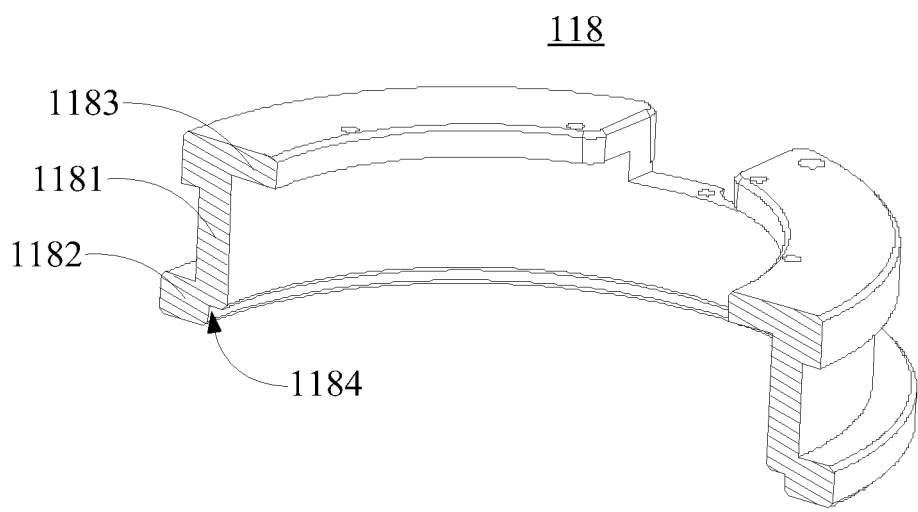
FIG. 12 is a cross sectional diagram of a support according to an embodiment of the present disclosure.

Illustratively, with reference to FIG. 12, the bracket 118 includes a cylindrical body 1181, an outer bottom wall 1182 and an inner top wall 1183 which are respectively obliquely connected with the two ends of the cylindrical body 1181, and the outer bottom wall 1182 and the inner top wall 1183 extend in reverse directions. The cylindrical body 1181 is arranged outside of the braking assembly 114. The outer bottom wall 1182 is connected with the upper fixing portion 11252, and is limited to the outer side of the upper annular limiting portion 11253 in radial direction. The reading head 1152A, reading head 1152B and their respective circuit boards are all connected with the inner top wall 1183. Of course, the bracket 118 may not include the inner top wall 1183, as long as the encoding assembly 115 is capable of be assembled on the bracket 118. Furthermore, the inner side of the corner defined by the outer bottom wall 1182 and the cylindrical body 1181 may define an avoiding groove 1184, the upper annular limiting portion 11253 is received in the avoiding groove 1184 after the bracket 118 is assembled with the upper bearing seat 1125, so at to improve the compact of the joint module 11, especially in the radial direction of the output shaft 1121.

It should be noted that, in an embodiment as shown in FIG. 2, for the sake of differentiation, the encoding assembly for detecting the rotation state of the driving assembly 112 may be defined as the first encoding assembly, and the encoding assembly for detecting the rotation state of the speed reduction assembly 113 may be defined as the second encoding assembly. The first encoding assembly includes the encoding disk 1151A and the reading head 1152A, and the second encoding assembly includes the encoding disk 1151B and the reading head 1152B.

Based on the above related description, the encoding assembly 115 may be configured to detect the rotation state (including the rotation speed and/or the angular position) of a shaft to be detected (such as an output shaft 1121 or a hollow shaft 1137). In combination with FIG. 8, when the encoding assembly 115 is configured to detect the rotation state of the output shaft 1121, the encoding disk 1151A and the reading head 1152A are two separate structural members, which are respectively assembled with the adapter 1129 and the bracket 118 one by one, so that the corresponding position between the encoding disk 1151A and the reading head 1152A (especially the axial spacing of the output shaft 1121) is important to the subsequent assembly accuracy. When the encoding assembly 115 is configured to detect the rotation state of the output shaft 1121, a similar problem also exists, which may lead to a poor detection accuracy of the encoding assembly 115. In combination with FIGS. 14 and 16, the difference of the present disclosure is that, the encoding assembly 115 is integratedly designed, that is, the encoding assembly 115 is an integrated encoding assembly, so that the axial spacing between the encoding disk 1151A and the reading head 1152A (or the axial spacing between the encoding disk 1151B and the reading head 1152B) may be debugged and determined before the encoding assembly 115 is assembled to the joint module 11, as such, the detection accuracy of the encoding assembly 115 is improved. Furthermore, in combination with FIG. 13, for the convenience of description, the present disclosure takes the output shaft 1121 as the shaft to be detected as an example.

Figure 14:
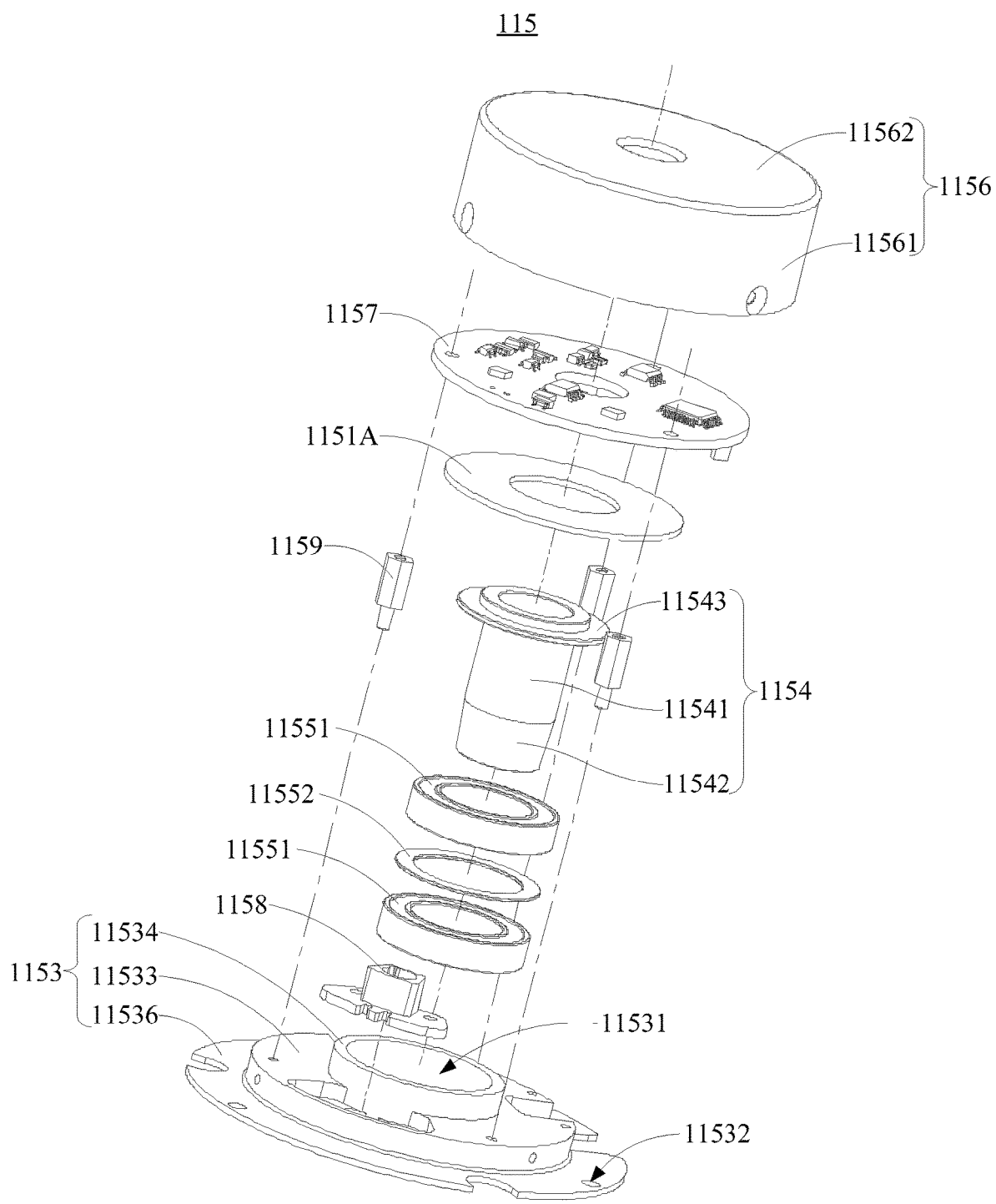
FIG. 14 is an exploded diagram of the encoding assembly according to an embodiment of the present disclosure.
Figure 16:
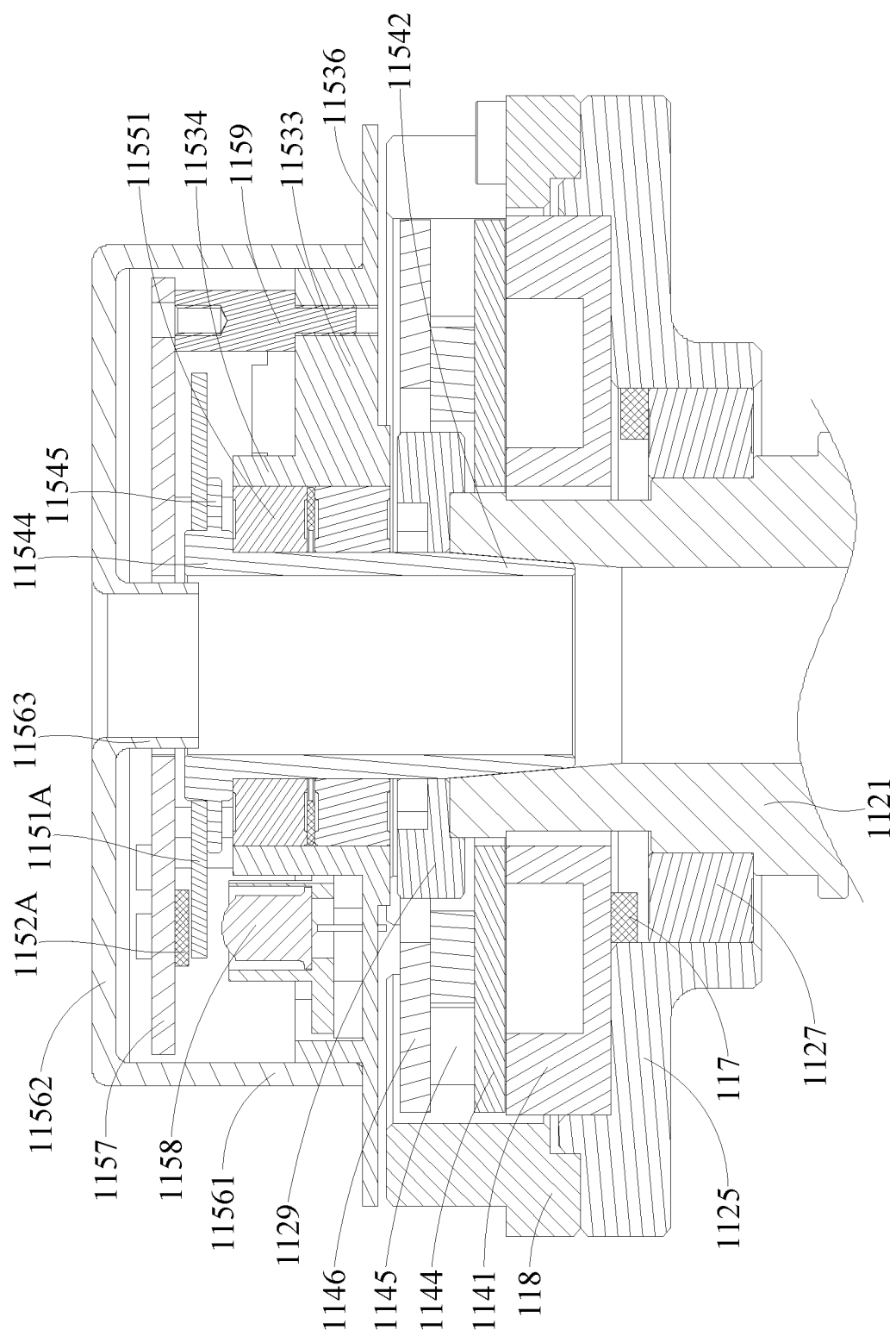
FIG. 16 is a cross sectional diagram of the encoding assembly according to an embodiment of the present disclosure.

Illustratively, in combination with FIGS. 14 and 16, the encoding assembly 115 includes a base 1153, a rotating shaft 1154, the encoding disk 1151A, and the reading head 1152B. The rotating shaft 1154 is rotatably arranged on the base 1153, and connected with the shaft to be detected, such as the output shaft 1121 or the hollow shaft 1137. The encoding disk 1151A is connected with the rotating shaft 1154, and the reading head 1152B and its circuit board are relatively fixed with the base 1153, making the encoding assembly 115 be a modular structure. In this way, before the encoding module 115 is assembled and used, the axial spacing between the encoding disk 1151A and the reading head 1152A may be debugged and determined, which may improve the detection accuracy of the encoding module 115. The base 1153 is arranged to keep stationary relative to the output shaft 1121, and the rotating shaft 1154 is arranged to rotate synchronously with the output shaft 1121, for the encoding assembly 115 to detect the rotation speed and/or the angular position of the output shaft 1121.

In some embodiments, in combination with FIG. 13, the rotating shaft 1154 is hollow, and the hollow shaft 1137 may be partially inserted into the rotating shaft 1154 after passing through the input shaft 1131 and the output shaft 1121, to facilitate the setting of the wiring structure of the joint module 11.

Figure 15A:
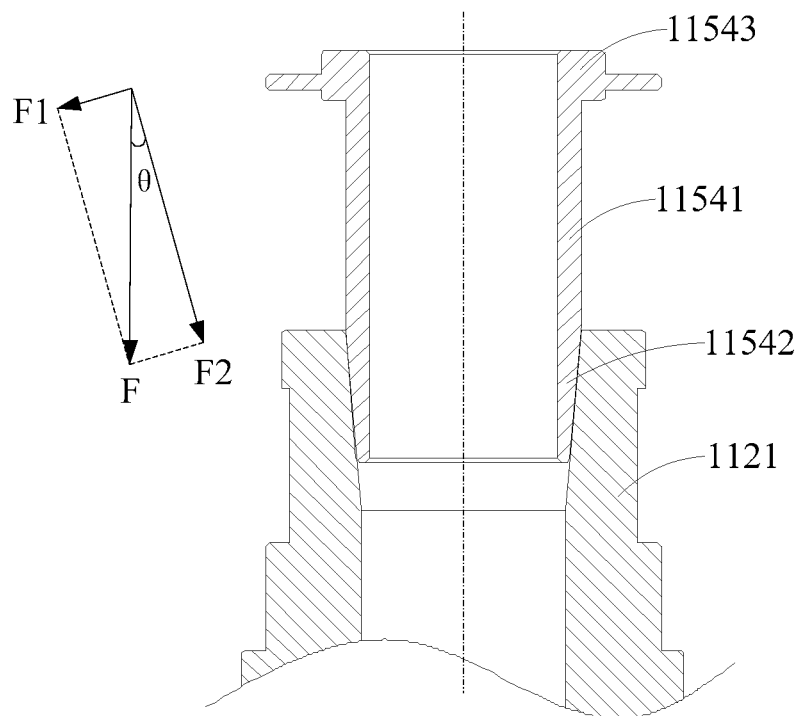
FIG. 15(a) and FIG. 15(b) are structural diagrams of various connections between a rotating shaft and an output shaft according to embodiments of the present disclosure.
Figure 15B:
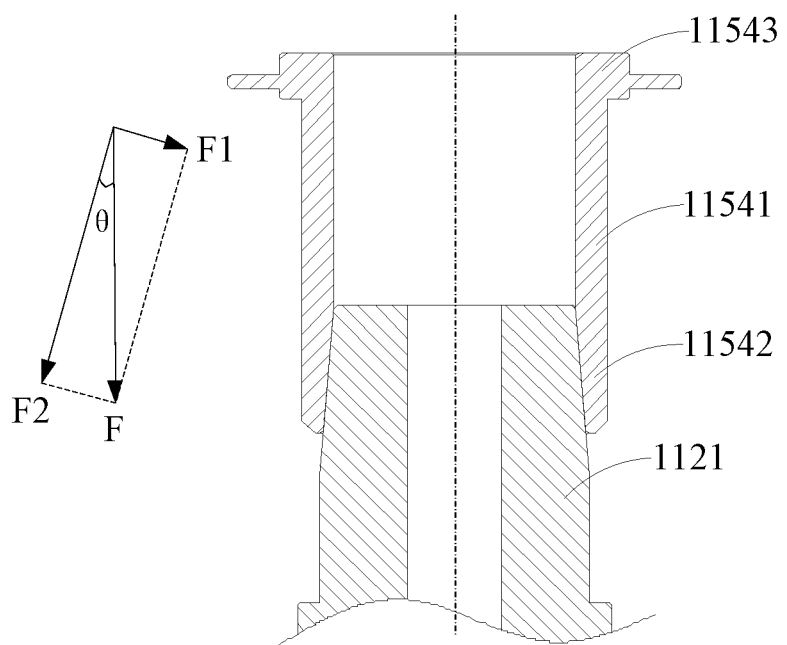

Illustratively, in combination with FIG. 15, one of the rotating shaft 1154 and the output shaft 1121 is partially inserted into the other, and a pair of contact surfaces are formed. When the rotating shaft 1154 is partially inserted into the output shaft 1121, as shown in FIG. 15 (a), the pair of contact surfaces refer to the outer contour surface of the rotating shaft 1154 and the inner contour surface of the output shaft 1121, and the outer contour surface of the rotating shaft 1154 contacts the inner contour surface of the output shaft 1121; on the contrary, when the output shaft 1121 is partially inserted into the rotating shaft 1154, in combination with (b) in FIG. 15, the pair of contact surfaces refer to the outer contour surface of the output shaft 1121 and the inner contour surface of the rotating shaft 1154, and the outer contour surface of the output shaft 1121 contacts the inner contour surface of the rotating shaft 1154. Furthermore, the cross-sectional area of the contacted surface perpendicular to the axial direction of the output shaft 1121 gradually increases or decreases along the axial direction of the output shaft 1121. After being fixed, the base 1153 provides a pressing force to the pair of contact surfaces along the axial direction of the output shaft 1121, causing the rotating shaft 1154 to rotate with the output shaft 1121 under a friction force between the pair of contact surfaces. Specifically, the pressing force F may be decomposed into the first component force F1 perpendicular to the pair of contact surfaces and the second component force F2 parallel to the pair of contact surfaces, and the static friction coefficient of the rotating shaft 1154 or the output shaft 1121 at the pair of contact surfaces is $\mu$, and the friction force f of the rotating shaft 1154 and the output shaft 1121 at the pair of contact surfaces may be a product of the first component force F1 and the static friction coefficient $\mu$. In combination with FIG. 16, the present disclosure takes the technical solution of partially inserting the rotating shaft 1154 into the output shaft 1121 as an example to describe, which is beneficial to reduce the radial size of the encoding assembly 115.

Compared with the direct connection between the rotating shaft 1154 and the output shaft 1121 through fasteners such as bolts, the embodiment does not need to consider the minimum wall thickness of the rotating shaft 1154 or the output shaft 1121 and the space occupied by the fasteners, so the rotating shaft 1154 and the output shaft 1121 can be designed much more flexible, and the encoding assembly 115 and the driving assembly 112 are much more compact. Compared with the direct connection between the rotating shaft 1154 and the output shaft 1121 by glue, the embodiment does not have the problem of glue aging, and the overall structure is more reliable. Compared with the rotating shaft 1154 and the output shaft 1121 being non-circular holes and direct inserting match, the embodiment does not exist a mating gap, so the rotating shaft 1154 may rotate with the output shaft 1121 more synchronously, and the encoding assembly 115 may be assembled and disassembled more conveniently.

It should be noted that, in order to increase the detecting reliability of the encoding assembly 115 detecting the rotating state of the output shaft 1121, the coaxiality between the rotating shaft 1154 and the output shaft 1121 is high, so that the axis of the rotating shaft 1154 and the axis of the output shaft 1121 may be simply considered to be coincided with each other. Therefore, the axial direction of the output shaft 1121 may be simply regarded as the axial direction of the rotating shaft 1154, and the radial direction of the output shaft 1121 may also be simply regarded as the radial direction of the rotating shaft 1154.

In some embodiments, in combination with FIG. 16, the other end of the rotating shaft 1154 away from the encoding disk 1151A passes through the adapter 1129 under the guidance of the adapter 1129 and partially extends into the output shaft 1121, so the adapter 1129 can limit the rotating shaft 1154 in the radial direction of the output shaft 1121, which is conducive to increasing the coaxiality between the rotating shaft 1154 and the output shaft 1121, especially when the end of the rotating shaft 1154 is designed as a gradual structure. In combination with the above description, the friction plate 1145 may also sleeve on the adapter 1129 and connect with the output shaft 1121, so that the adapter 1129 has two functions, which is conducive to simplifying the structure of the joint module 11.

Figure 17:
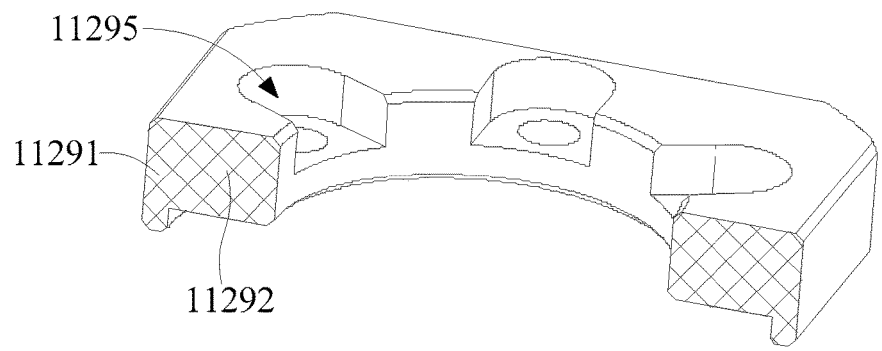
FIG. 17 is a cross sectional diagram of the adapter according to an embodiment of the present disclosure.

Illustratively, in combination with FIG. 17, the adapter 1129 is designed as a ring structure, and the rotating shaft 1154 may be inserted into the output shaft 1121 along the inner ring surface of the adapter 1129. The radius of the inner ring surface remains unchanged in the axial direction of the output shaft 1121. Correspondingly, the outer diameter of the part of the rotating shaft 1154 that fits with the adapter 1129 remains unchanged in the axial direction of the output shaft 1121. In this way, compared with the gradual structure, the cylindrical equal diameter structure is more conducive to increasing the coaxiality between the rotating shaft 1154 and the output shaft 1121.

Similarly, the adapter 1129 includes a cylindrical body 11291 and an inner flange portion 11292 connected with the cylindrical body 11291. The radius of the inner ring surface of the cylindrical body 11291 remains unchanged in the axial direction of the output shaft 1121, so that the adapter 1129 can guide the rotating shaft 1154. The outer contour of the cylindrical body 11291 is non-circular when viewed along the axial direction of the output shaft 1121, so that the friction plate 1145 can sleeve on the adapter 1129.

Furthermore, the inner flange portion 11292 may be provided with a plurality of counter bores 11295 spaced apart from each other around the rotating shaft 1154, for example, the quantity of counter bores 11295 is six, so the fifth fastener 1164 can fix the inner flange portion 11292 on the output shaft 1121 by inserting into the counter bore 11295. In other words, the fifth fastener 1164 does not protrude out of the adapter 1129 in the axial direction of the output shaft 1121, which is conducive to increasing the structural compactness of the joint module 11.

Illustratively, in combination with FIGS. 14 and 16, the base 1153 defines a bearing hole 11531. The encoding assembly 115 includes a bearing 11551 inserted in the bearing hole 11531, so that the rotating shaft 1154 may be rotatably arranged on the base 1153. Of course, if the speed of the shaft to be detected is not high, for example, the speed of the hollow shaft 1137 is much smaller than that of the output shaft 1121, the encoding assembly 115 may not include the bearing 11551, that is, the rotating shaft 1154 is directly matched with the bearing hole 11531, for example, clearance fit, and the rotating shaft 1154 can also be rotatably arranged on the base 1153.

In some embodiments, the rotating shaft 1154 includes a connecting portion 11541, an inserting portion 11542, and a protruding portion 11543, the inserting portion 11542 and the protruding portion 11543 are respectively connected to both ends of the connecting portion 11541. The connecting portion 11541 may be inserted in the inner ring of the bearing 11551, and the inserting portion 11542 and the protruding portion 11543 are respectively extend from both sides of the bearing 11551. The protruding portion 11543 presses the inner ring of the bearing 11551 along the axial direction of the output shaft 1121, and the encoding disk 1151A connects with the protruding portion 11543. Furthermore, the outer diameter of the inserting portion 11542 gradually decreases in the axial direction of the output shaft 1121 and in the direction away from the protruding portion 11543, the inserting portion 11542 may be inserted into the output shaft 1121, thereby forming a pair of contact surfaces. Based on the above related description, the outer diameter of the inserting portion 11542 may first remain unchanged and then gradually decrease in the axial direction of the output shaft 1121 and in the direction away from the protruding portion 11543, so the inserting portion 11542 may pass through the adapter 1129 and partially insert in the output shaft 1121 under the guidance of the adapter 1129.

Illustratively, in combination with FIG. 15, an angle θ between the outer contour of the inserting portion 11542 and the axial direction of the output shaft 1121 may be between 2° and 33°. When the value of the pressing force F and other parameters are fixed, the value of the angle θ determines the value of the first component force F1, that is, F1=F*sin θ. It is worth noting that, although the larger the angle θ is, the greater the first component force F1 is, which is more conducive to providing sufficient friction. However, the outer contour surface of the inserting portion 11542 and the inner contour surface of the output shaft 1121 may become sharper, which will reduce the structural strengths of ends of the inserting portion 11542 and the output shaft 1121. Conversely, although the smaller the angle θ is, the better to ensure the structural strengths of the ends of the inserting portion 11542 and the output shaft 1121, however, there may be a risk that the rotating synchronicity between the rotating shaft 1154 and the output shaft 1121 becomes worse.

In some embodiments, the ratio of an absolute value difference between the minimum outer diameter and the maximum outer diameter of the inserting portion 11542 to the maximum outer diameter of the inserting portion 11542 may be between 0.05 and 0.2, allowing the angle θ being within an appropriate range. In addition, the angle θ with a certain value is conducive to ensuring the structural strengths of the ends of the insertion portion 11542 and the output shaft 1121.

In some embodiments, the depth of the inserting portion 11542 inserting into the output shaft 1121 in the axial direction of the output shaft 1121 may be between 6 mm and 10 mm, allowing the angle θ to be within an appropriate range.

In combination with FIGS. 14 and 16, when viewed along the axial direction of the output shaft 1121, the edge area of the base 1153 defines a plurality of mounting holes 11532 spaced apart from each other around the rotating shaft 1154, and the base 1153 is fixed on the housing 111 or the bracket 118 by fixing fasteners such as bolts in the mounting holes 11532. There is a first distance in the radial direction of the output shaft 1121 between the center of the mounting hole 11532 and the center of the bearing hole 11531, and the mounting hole 11532 moves a second direction along the axial direction of the output shaft 1121 before and after the base 1153 is fixed. The first distance may be between 26 mm and 40 mm, and the second distance may be between 0.1 mm and 1 mm. It should be noted that, in the embodiment where the base 1153 is fixed on the bracket 118, before the base 1153 is fixed, there is a gap between the mounting hole 11532 and the bracket 118 in the axial direction of the output shaft 1121, and the gap may be the second distance. Referring to FIG. 16, when the parameters such as the angle θ and the stiffness of the base 1153 are fixed values, the ratio of the second distance to the first distance determines the pressing force F. It is worth noting that although the larger the ratio is, the greater the pressing force F is, which is more conducive to providing sufficient friction. However, there is also a risk that the output shaft 1121 may be "jacked" along its axis. On the contrary, although the smaller the ratio is, the better to avoid the output shaft 1121 being "jacked" along its axis, but there is also a risk of resulting an insufficient pressing force F.

In some embodiments, in combination with FIG. 14, the protruding portion 11543 includes a first protruding section 11544 connected with the connecting portion 11541, and a second protruding section 11545 connected with the first protruding section 11544. The first protruding section 11544 surrounds the connecting portion 11541, and the second protruding section 11545 surrounds the first protruding section 11544. The thickness of the second protruding section 11545 in the axial direction of the output shaft 1121 may be less than that of the first protruding section 11544 in the axial direction of the output shaft 1121, so that the first protruding section 11544 presses the inner ring of the bearing 11551 along the axial direction of the output shaft 1121, and the second protruding section 11545 are spaced apart from the outer ring of the bearing 11551 and the base 1153 in the axial direction of the output shaft 1121, which is beneficial to avoid unnecessary collision between the rotating shaft 1154 and the bearing 11551 or the base 1153. Similarly, the encoding assembly 115 includes a snap ring sleeved on the connecting portion 11541, the snap ring and the first protruding section 11544 clamp the inner ring of the bearing 11551. Furthermore, the encoding disk 1151A may be connected with the side of the second protruding section 11545 away from the bearing 11551, and the side of the encoding disk 1151A away from the second protruding section 11545 may not protrude from the first protruding section 11544 in the axial direction of the output shaft 1121, which is conducive to avoiding structural interference or collision between the encoding disk 1151A and other structural members, especially when the encoding disk 1151A is a grating disk. In other words, the encoding disk 1151A is ring shaped and may sleeve on the rotating shaft 1154.

In some embodiments, at least two bearings 11551 may be stacked in the axial direction of the output shaft 1121, so the coaxiality of the rotating shaft 1154 with respect to the bearing hole 11531 is increased, and the rotating shaft 1154 rotates more smoothly with respect to the base 1153. A spacer 11552 may be clamped between the outer rings or inner rings of two adjacent bearings 11551. The spacer 11552 makes that the gap between the outer rings of two adjacent bearings 11551 is different from the gap between the inner rings of two adjacent bearings 11551, that is, the outer ring and the inner ring of bearing 11551 are staggered for a distance in the axial direction of the output shaft 1121, which is conducive to controlling the clearance of the bearing 11551 within a reasonable range, thus increasing the rotation stability of the rotating shaft 1154.

Based on the above related description, in an embodiment as shown in FIG. 13, the encoding assembly 115 may be a magneto-electric encoder or a photoelectric encoder, and the encoding disk 1151A is correspondingly a magnetic grating disk or a grating disk. Compared with the magneto-electric encoder, the photoelectric encoder has more stringent requirements on the external environment, for example, the photoelectric encoder has a higher dust prevention requirement. The encoding disk 1151A which is a grating disk will be illustrated in the following.

In combination with FIGS. 14 and 16, the protruding portion 11543 completely covers the bearing hole 11531 when the protruding portion 11543 is orthogonally projected to the base 1153 along the axial direction of the output shaft 1121, so as to prevent external matters (such as grinding dust generated by the friction plate 1145 during operation) from entering into the encoding assembly 115 through the bearing hole 11531 to pollute the encoding disk 1151A, which is conducive to increasing the dust prevention performance of the encoding assembly 115. Specifically, when the first protruding section 11544 is orthogonally projected onto the base 1153 along the axial direction of the output shaft 1121, the orthographic projection falls into the bearing hole 11531. When the second protruding section 11545 is orthogonally projected onto the base 1153 along the axial direction of the output shaft 1121, the orthographic projection partially overlaps with the base 1153, allowing the protruding portion 11543 to completely cover the bearing hole 11531.

Illustratively, with reference to FIG. 14, the base 1153 includes a middle step portion 11533 and an inner step portion 11534 connected with the middle step portion 11533. The inner step portion 11534 is closer to the rotating shaft 1154 than the middle step portion 11533 in the radial direction of the output axis 1121, and the thickness of the inner step portion 11534 in the axial direction of the output shaft 1121 is greater than that of the middle step portion 11533 in the axial direction of the output shaft 1121. The bearing hole 11531 is defined in the inner step portion 11534 to allow at least two bearings 11551 to be stacked in the bearing hole 11531 along the axial direction of the output shaft 1121, thereby increasing the coaxiality of the rotating shaft 1154 with respect to the bearing hole 11531, making the rotating shaft 1154 rotate with respect to the base 1153 stably. Furthermore, in combination with FIG. 16, when the encoding disk 1151A is orthographically projected to the base 1153 along the axial direction of the output shaft 1121, the orthographic projection partially overlaps with the middle step portion 11533, and the distance between the encoding disk 1151A and the middle step portion 11533 in the axial direction of the output shaft 1121 is greater than the distance between the encoding disk 1151A and the inner step portion 11534 in the axial direction of the output shaft 1121. In other words, there is a greater safety clearance between the edge area of the encoding disk 1151A away from the rotating shaft 1154 and the base 1153 in the axial direction of the output shaft 1121, which is conducive to avoiding unnecessary collision between the encoding disk 1151A and the base 1153, especially when the encoding disk 1151A is a grating disk. As such, by way of arranging at least a part of the base 1153 as a ladder structure, both the rotation stability of the rotating shaft 1154 and the anti-collision of the encoding disk 1151A may be ensured, namely, "killing two birds with one stone". Of course, the weight of the encoding assembly 115 can also be reduced to a certain extent.

In some embodiments, the second protruding section 11545 is spaced apart from the outer ring of the bearing 11551 and the inner step portion 11534 in the axial direction of the output shaft 1121, to avoid unnecessary collision between the rotating shaft 1154 and the bearing 11551 or the base 1153. When the second protruding section 11545 is orthogonally projected to the base 1153 along the axial direction of the output shaft 1121, the orthographic projection may partially overlap with the inner step portion 11534, that is, the protruding portion 11543 completely covers the bearing hole 11531, which is conducive to increasing the dust-proof performance of the encoding assembly 115.

Figure 18:
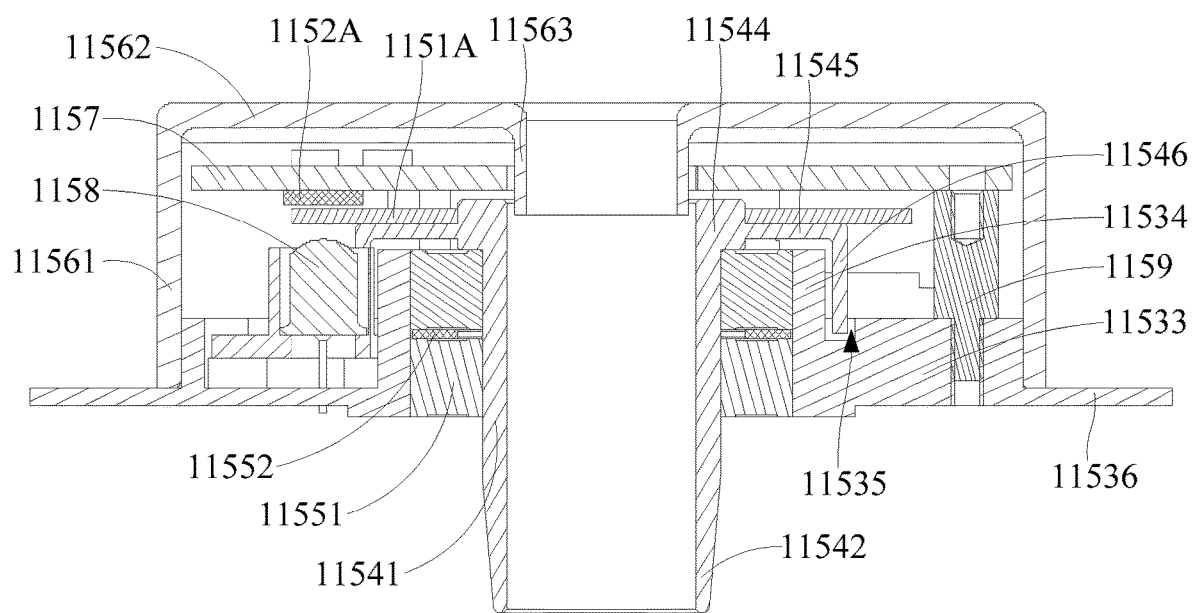
FIG. 18 is a cross sectional diagram of the encoding assembly according to an embodiment of the present disclosure.

Referring to FIG. 18, the protruding portion 11543 includes a third protruding portion 11546 obliquely connected with the second protruding section 11545. The third protruding portion 11546 surrounds the inner step portion 11534 to prolong the path of external matters entering the encoding assembly 115, which is also conducive to increasing the dust prevention performance of the encoding assembly 115. The middle step portion 11533 defines a groove 11535 surrounding the inner step portion 11534, and the third protruding section 11546 may be partially inserted into the groove 11535. In this way, it is not only conducive to prolong the path of external matters entering the encoding assembly 115, but also conducive to collecting external matters that have passed through the bearing 11551 into the groove 11535, thus increasing the difficulty of external matters further entering the encoding assembly 115. It should be noted that, whether the middle step portion 11533 defines the groove 11535 or not, the third protruding portion 11546 is always spaced apart from the middle step portion 11533 in the axial direction of the output shaft 1121 to avoid unnecessary collision between the rotating shaft 1154 and the base 1153.

In combination with FIGS. 14 and 16, the encoding assembly 115 includes an upper cover 1156, a circuit board 1157, and a light source 1158. The upper cover 1156 connects with the base 1153 to form a cavity configured for receiving the encoding disk 1151A, the circuit board 1157, and other structural members. The light source 1158 is configured to transmit the detection signal to the encoding disk 1151A, and the reading head 1152A is set on the circuit board 1157 and configured to receive the detection signal. Furthermore, the light source 1158 and the reading head 1152A (and the circuit board 1157 connected to the reading head 1152A) are respectively arranged on opposite sides of the encoding disk 1151A, allowing the reading head 1152A to receive the detection signal transmitted by the light source 1158 and has passed through the encoding disk 1151A, thus forming an opposed optical encoder. The light source 1158 and the reading head 1152A (and the circuit board 1157 connected to the reading head 1152A) may also be set on a same side of the encoding disk 1151A, allowing the reading head 1152A to receive the detection signal transmitted by the light source 1158 and has been reflected by the encoding disk 1151A, thus forming a reflective optical encoder.

Illustratively, the upper cover 1156 includes an outer cylindrical sidewall 11561 and a top cover 11562 connected to one end of the outer cylindrical sidewall 11561, the outer cylindrical sidewall 11561 surrounds the middle step portion 11533. Since the thickness of the middle step portion 11533 in the axial direction of the output shaft 1121 is generally greater than the thickness of the outer cylindrical sidewall 11561 in the radial direction of the output shaft 1121, compared with arranging the outer cylindrical sidewall 11561 on the middle step portion 11533, the outer cylindrical sidewall 11561 surrounding the middle step portion 11533 is more conducive to increasing the matching area between the outer cylindrical sidewall 11561 and the middle step portion 11533, and is more conducive to improving the dust prevention performance of the encoding assembly 115. Of course, increasing the matching area between the outer cylindrical sidewall 11561 and the middle step portion 11533 is also conducive to increasing the reliability of the connection between the upper cover 1156 and the base 1153.

In some embodiments, the base 1153 includes an outer step portion 11536 connected with the middle step portion 11533. The middle step portion 11533 is closer to the rotating shaft 1154 than the outer step portion 11536 in the radial direction of the output shaft 1121. The thickness of the middle step portion 11533 in the axial direction of the output shaft 1121 is greater than that of the outer step portion 11536 in the axial direction of the output shaft 1121. In other words, in case the base 1153 includes the outer step portion 11536, the middle step portion 11533 and the inner step portion 11534, all the outer step portion 11536, the middle step portion 11533 and the inner step portion 11534 gradually approach the rotating shaft 1154 in the radial direction of the output shaft 1121, and the thickness of the base 1153 in the axial direction of the output shaft 1121 gradually increases. The outer step portion 11536 may be fixed on the bracket 118 or the housing 111, that is, the mounting hole 11532 may be defined in the outer step portion 11536; the outer cylindrical sidewall 11561 may also be arranged on the outer step portion 11536. Correspondingly, the encoding disk 1151A and the circuit board 1157 may be arranged on the inner side of the outer cylindrical sidewall 11561.

In some embodiments, the light source 1158 may be arranged on the middle step portion 11533. The side of the middle step portion 11533 away from the encoding disk 1151A defines a mounting groove, and the light source 1158 is arranged in the mounting groove. In other words, the light source 1158 is arranged outside the encoding assembly 115, which is conducive to simplifying the wiring of the light source 1158, as well as facilitating the assembly of the light source 1158. For the opposed optical encoders, the circuit board 1157 may be arranged on the side of the encoding disk 1151A away from the base 1153, that is, the circuit board 1157 is arranged between the encoding disk 1151A and the top cover 11562 in the axial direction of the output shaft 1121. The outer diameter of the circuit board 1157 in the radial direction of the output shaft 1121 may be greater than the outer diameter of the encoding disc 1151A in the radial direction of the output shaft 1121. Furthermore, the encoding assembly 115 includes a plurality of supporting rods 1159 spaced apart from each other around the rotating shaft 1154. For example, the quantity of supporting rods 1159 is three, the supporting rods 1159 are supported between the middle step portion 11533 and the circuit board 1157, and are arranged outside the encoding disk 1151A. Of course, the circuit board 1157 may also be fixed on the top cover 11562.

In some embodiments, the light source 1158 may be arranged on the circuit board 1157, that is, the light source 1158 and the reading head 1152A are both arranged on the circuit board 1157, thus forming the reflective optical encoders. In this way, the circuit board 1157 may be arranged on the side of the encoding board 1151A away from the base 1153, for example being supported on the middle step portion 11533 by the supporting rod 1159, or for example being fixed on the top cover 11562. The circuit board 1157 may also be arranged on the side of the encoding board 1151A adjacent to the base 1153, for example, being fixed on the middle step section 11533.

Based on the above related description, in order to facilitate the setting of the wiring structure of the joint module 11, the rotating shaft 1154 communicates with the outside of the encoding assembly 115 after passing through the avoiding holes defined in the encoding disk 1151A, the circuit board 1157, and the top cover 11562 in sequence. In this case, there is a risk that external matters (such as grinding dust generated by the friction plate 1145 during operation) enters into encoding assembly 115 through the avoiding holes in the top cover 11562 and pollutes the encoding disk 1151A. Therefore, it is necessary to improve the relevant structure to improve the dust prevention performance of the encoding assembly 115.

Referring to FIG. 16, the upper cover 1156 includes an inner cylindrical sidewall 11563 connected to the top cover 11562, and the inner cylindrical sidewall 11563 and the outer cylindrical sidewall 11561 extend in a same direction towards the same side of the top cover 11562. The inner cylindrical sidewall 11563 partially extends into the rotating shaft 1154 along the axial direction of the output shaft 1121 to prolong the path of external matters entering the encoding assembly 115, thereby increasing the dust prevention performance of the encoding assembly 115. Correspondingly, the circuit board 1157 is ring shaped and sleeves around the inner cylindrical sidewall 11563. Since the circuit board 1157 and the upper cover 1156 may be kept relatively stationary, the gap between the inner peripheral surface of the circuit board 1157 and the outer peripheral surface of the inner cylindrical sidewall 11563 in the radial direction of the output shaft 1121 may be as small as possible to meet the gap requirements for the assembly of the circuit board 1157 and the upper cover 1156.

In some embodiments, the depth of the inner cylindrical sidewall 11563 inserted into the rotating shaft 1154 in the axial direction of the output shaft 1121 may be between 1 mm and 3 mm. The deeper the depth is (that is, the deeper the inner cylindrical sidewall 11563 inserting into the rotating shaft 1154 along the axial direction of the output shaft 1121), the more conducive to lengthening the path of external matters entering the encoding assembly 115. However, since the rotating speed of the rotating shaft 1154 may be the same as that of the output shaft 1121, it is also prone to cause an unnecessary collision between the rotating shaft 1154 and the inner cylindrical sidewall 11563. On the contrary, the smaller the depth is (that is, the shallower the inner cylindrical sidewall 11563 inserting into the rotating shaft 1154 along the axial direction of the output shaft 1121), the more conducive to avoiding the collision between the rotating shaft 1154 and the inner cylindrical sidewall 11563, but it is also prone to weaken the dust prevention performance of the encoding assembly 115.

In some embodiments, the clearance between the inner cylindrical sidewall 11563 and the rotating shaft 1154 in the radial direction of the output shaft 1121 may be between 0.1 mm and 1 mm. The smaller the clearance is, the more conducive to preventing external matters from entering the encoding assembly 115, however, since the rotating speed of the rotating shaft 1154 may be the same as that of the output shaft 1121, there is also a risk of existing unnecessary collision between the rotating shaft 1154 and the inner cylindrical sidewall 11563. On the contrary, the larger the clearance is, the more conducive to avoiding the collision between the rotating shaft 1154 and the inner cylindrical sidewall 11563, however, it is also prone to weaken the dust prevention performance of the encoding assembly 115.

In some embodiments, similar to the solution of arranging the end of the rotating shaft 1154 with a gradually changed structure, the outer diameter of the portion of the inner cylindrical sidewall 11563 inserted into the rotating shaft 1154 gradually decreases along the axial direction of the output shaft 1121 and the direction away from the top cover 11562, to form a gradually changing structure. Correspondingly, the inner diameter of the portion of the rotating shaft 1154 for receiving the inner cylindrical sidewall 11563 gradually decreases along the axial direction of the output shaft 1121 and the direction away from the top cover 11562, to form a gradually changed structure matched with the inner cylindrical sidewall 11563. In this way, compared with the columnar structure with equal diameter, the gradually changed structure is also conducive to prolong the path of external matters entering the encoding assembly 115, thus increasing the dust-proof performance of the encoding assembly 115.

Since the circuit board 1157 may be arranged on the side of the encoding disk 1151A away from the base 1153, the orthographic projection of the circuit board 1157 along the axial direction of the output shaft 1121 completely covers the encoding disk 1151A, as such, if there is external matters, the external matters will fall on the circuit board 1157 first before entering the encoding assembly 115, thus prolonging the path of external matters falling on the encoding disk 1151A, which is also conducive to improving the dust-proof performance of the encoding assembly 115, especially when the upper cover 1156 defines an avoiding hole for wiring and does not include the inner cylindrical sidewall 11563.

Illustratively, the ratio of the outer diameter of the circuit board 1157 in the radial direction of the output shaft 1121 to the outer diameter of the encoding disc 1151A in the radial direction of the output shaft 1121 is between 1 and 1.8. Although the larger the ratio is, the more conducive to prolong the path of external matters falling on the encoding disk 1151A, but it is also prone to cause the radial size of the encoding assembly 115 being too large, which is not conducive to the miniaturization of the encoding assembly 115. On the contrary, although the smaller the ratio is, the more conducive to the miniaturization of the encoding assembly 115, it is also prone to weaken the dust prevention performance of the encoding assembly 115, and not convenient to arrange the supporting rod 1159. Furthermore, the distance between the outer peripheral surface of the circuit board 1157 and the outer peripheral surface of the encoding disk 1151A in the radial direction of the output shaft 1121 is greater than or equal to 3 mm, so as to take into account the setting of the supporting rod 1159 and the anti-collision of the encoding disk 1151A on the basis of improving the dust-proof performance of the encoding assembly 115.

The foregoing description merely depicts some embodiments of the present disclosure and therefore is not intended to limit the protection scope of the present disclosure. Any equivalent device or equivalent process transformation based on the content of the present disclosure and the drawings, or directly or indirectly applied in other related technical fields, shall all fall in the scope of the present disclosure.

What is claimed is:

1. A joint module of a robot arm, wherein the joint module comprises:
   a housing;
   a driving assembly, comprising a lower bearing seat defining an avoiding hole and a lower bearing having an outer ring connected with the lower bearing seat;
   a speed reduction assembly, comprising an input shaft, a wave generator connected with the input shaft, a flexible wheel sleeved on the wave generator, a rigid wheel sleeved on the flexible wheel, and an outer bearing, the flexible wheel comprising a cylindrical engaging portion and an annular bending portion obliquely connected with the cylindrical engaging portion, the annular bending portion extending to an outside of the cylindrical engaging portion, the cylindrical engaging portion being partially engaged with the rigid wheel, and the rigid wheel being connected with an inner ring of the outer bearing;
   a first fastener, configured to fix the lower bearing seat on the housing;
   a second fastener, configured to fix the speed reduction assembly on the housing; and
   a fourth fastener, configured to fix the annular bending portion on an outer ring of the outer bearing, a part of the fourth fastener protruding from the annular bending portion being arranged in the avoiding hole of the lower bearing seat.

2. The joint module as claimed in claim 1, wherein
   the joint module further comprises a third fastener; and
   the driving assembly further comprises an output shaft connected with an inner ring of the lower bearing seat, the third fastener being configured to fix the input shaft on the output shaft.

3. The joint module as claimed in claim 2, wherein an inner side of the housing is provided with a first annular supporting platform, the first fastener is connected with the first annular supporting platform after passing through the lower bearing seat to press the lower bearing seat on the first annular supporting platform; the second fastener is connected with the first annular supporting platform after passing through the speed reduction assembly and the lower bearing seat in sequence to press the speed reduction assembly and the lower bearing seat on the first annular supporting platform.

4. The joint module as claimed in claim 3, wherein the output shaft is extended out of the lower bearing seat, and a mounting surface between the input shaft and the output shaft is arranged in the speed reduction assembly in an axial direction of the output shaft.

5. The joint module as claimed in claim 3, wherein the lower bearing seat comprises:
   a lower cylindrical portion, sleeved on the lower bearing seat; and
   a lower fixing portion, obliquely connected with one end of the lower cylindrical portion, the lower fixing portion extending to an outside of the lower cylindrical portion, the first fastener and the second fastener passing through the lower fixing portion, and the lower bearing being at least partially located in the speed reduction assembly.

6. The joint module as claimed in claim 5, wherein the lower bearing seat comprises:
   a lower flange portion, obliquely connected with the other end of the lower cylindrical portion, the lower flange portion and the lower fixing portion extending in opposite directions, and the outer ring of the lower bearing being supported on the lower flange portion.

7. The joint module as claimed in claim 6, wherein the driving assembly further comprises:
   a stator, embedded in the first annular supporting platform; and
   a rotor, arranged on an inner side of the stator, the output shaft defining an intermediate fixing section and a lower fixing section along the axial direction of the output shaft, an outer diameter of the intermediate fixing section being greater than that of the lower fixing section, allowing an outer step surface being defined between the intermediate fixing section and the lower fixing section, the rotor being fixed on the intermediate fixing section, the lower bearing being sleeved on the lower fixing section, an inner ring of the lower bearing being arranged on the outer step surface, the outer step surface being arranged on one side of the lower bearing in an axial direction of the output shaft, and the lower flange portion being arranged on the other side of the lower bearing in an axial direction of the output shaft.

8. The joint module as claimed in claim 7, wherein the driving assembly further comprises:
   a lower pressing ring, connected with the lower fixing portion, and configured to clamp the outer ring of the lower bearing cooperatively with the lower flange portion; and
   a lower clamping ring, connected with the lower fixing portion, and configured to clamp the inner ring of the lower bearing cooperatively with the intermediate fixing section.

9. The joint module as claimed in claim 7, wherein orthographic projections of the stator and the lower bearing along a radial direction of the output shaft is spaced apart from each other.

10. The joint module as claimed in claim 7, wherein the input shaft has a hollow structure, an inner diameter of the lower fixing section is smaller than that of the intermediate fixing section, to allow the third fastener to fix the input shaft on an end of the lower fixing section.

11. The joint module as claimed in claim 5, wherein the lower bearing is arranged on an inner side of the flexible wheel away from the rigid wheel in a radial direction of the output shaft.

12. The joint module as claimed in claim 11, wherein the speed reduction assembly comprises:
   a flange plate, the second fastener being configured to fix one of the inner ring and the outer ring of the outer bearing on the first annular supporting platform, and the flange plate being connected with the other one of the inner ring and the outer ring of the outer bearing.

13. The joint module as claimed in claim 5, wherein the avoiding hole is passed through the lower fixing portion along an axial direction of the output shaft, and the fourth fastener is passed through the avoiding hole to contact with the first annular supporting platform.

14. The joint module as claimed in claim 12, wherein quantities of the first fastener, the second fastener and the fourth fastener are all more than one, the first fasteners, the second fasteners and the fourth fasteners are spaced apart from each other around the output shaft, respectively, and the second fasteners between two adjacent fourth fasteners around the output shaft are more than the first fasteners between two adjacent fourth fasteners around the output shaft.

15. The joint module as claimed in claim 12, wherein the input shaft has a hollow structure, an inner side of the input shaft is provided with a second annular supporting platform, the output shaft is inserted into the input shaft, and an end face of the output shaft is resisted against the second annular supporting platform, the third fastener is connected with the second annular supporting platform and the output shaft along an axial direction of the output shaft, the speed reduction assembly comprises a hollow shaft and an inner bearing, and one end of the hollow shaft is connected with the flange plate and passed through the input shaft and the output shaft in sequence, and the inner ring and the outer ring of the inner bearing are respectively connected with the hollow shaft and the input shaft.

16. The joint module as claimed in claim 3, wherein the driving assembly comprises:
   an upper bearing seat, arranged on a side of the lower bearing seat opposite to the speed reduction assembly and connected with the first annular supporting platform; and
   an upper bearing, comprising an inner ring connected with the output shaft and an outer ring connected with the upper bearing seat; and
the joint module comprises:
   a first elastic member; and
   a braking assembly, connected with the output shaft and configured to press the first elastic member on the outer ring of the upper bearing.

17. The joint module as claimed in claim 16, wherein orthographic projections of the upper bearing and the stator of the driving assembly are overlapped with each other in a radial direction of the output shaft.

18. The joint module as claimed in claim 16, wherein the braking assembly comprises:
   a mounting seat, connected to the upper bearing seat, the braking assembly being configured to press the first elastic member through the mounting seat;
   a second elastic member, arranged on a side of the mounting seat away from the first elastic member;
   a magnet exciting coil, arranged on the side of the mounting seat away from the first elastic member;
   an armature plate, configured to push a friction plate along an axial direction of the output shaft to contact a cover plate under an elastic force of the second elastic member when the magnet exciting coil being powered off, causing the output shaft to switch from a rotating state to a braking state; when the magnet exciting coil being energized, a magnetic field generated by the magnet exciting coil acting on the armature plate, making the friction plate separate from the cover plate to release the braking state of the output shaft;
   the friction plate, connected with the output shaft; and
   the cover plate, wherein the armature plate, the friction plate, and the cover plate are stacked in sequence along an axial direction of the output shaft;
the driving assembly comprises:
   an adapter, comprising a cylindrical body, an inner flange portion and an outer flange portion both connected with the cylindrical body, the adapter being connected with the output shaft, the friction plate being sleeved on the adapter, an outer contour of the adapter and an inner contour of the friction plate being non-circular and matched with each other when viewed along the axial direction of the output shaft, allowing the friction plate to rotate with the adapter, and allowing the friction plate to move relative to the adapter along the axial direction of the output shaft, the outer flange portion and the inner flange portion extending in reverse directions, an outer contour of the cylindrical body being non-circular when viewed along the axial direction of the output shaft, the friction plate being sleeved on the cylindrical body, the output shaft being inserted in the cylindrical body, and an end surface of the output shaft being abutted against the inner flange portion; and
the joint module further comprises: an encoding assembly, comprising:
   an encoding disk, connected with the adapter and the outer flange portion.

19. A robot arm, comprising a joint module, wherein the joint module comprises:
   a housing;
   a driving assembly, comprising a lower bearing seat defining an avoiding hole and a lower bearing having an outer ring connected with the lower bearing seat;
   a speed reduction assembly, comprising an input shaft, a wave generator connected with the input shaft, a flexible wheel sleeved on the wave generator, a rigid wheel sleeved on the flexible wheel, and an outer bearing, the flexible wheel comprising a cylindrical engaging portion and an annular bending portion obliquely connected with the cylindrical engaging portion, the annular bending portion extending to an outside of the cylindrical engaging portion, the cylindrical engaging portion being partially engaged with the rigid wheel, and the rigid wheel being connected with an inner ring of the outer bearing;
   a first fastener, configured to fix the lower bearing seat on the housing;
   a second fastener, configured to fix the speed reduction assembly on the housing; and
   a fourth fastener, configured to fix the annular bending portion on an outer ring of the outer bearing, a part of the fourth fastener protruding from the annular bending portion being arranged in the avoiding hole of the lower bearing seat.

20. The robot arm as claimed in claim 19, wherein the robot arm is an industrial robot arm.

* * * * *